(12) United States Patent
Kobayashi et al.

(10) Patent No.: US 10,605,144 B2
(45) Date of Patent: Mar. 31, 2020

(54) EXHAUST GAS PURIFICATION DEVICE FOR SHIP

(71) Applicant: Yanmar Co., Ltd., Osaka-shi, Osaka-fu (JP)

(72) Inventors: Ryota Kobayashi, Osaka (JP); Tsuyoshi Inoue, Osaka (JP); Tetsuya Yokoyama, Osaka (JP); Yasuyuki Takahata, Osaka (JP); Shunji Hamaoka, Osaka (JP)

(73) Assignee: YANMAR CO., LTD., Osaka (JP)

( * ) Notice: Subject to any disclaimer, the term of this patent is extended or adjusted under 35 U.S.C. 154(b) by 0 days.

(21) Appl. No.: 15/768,443

(22) PCT Filed: May 27, 2016

(86) PCT No.: PCT/JP2016/065833
§ 371 (c)(1),
(2) Date: Apr. 13, 2018

(87) PCT Pub. No.: WO2017/064877
PCT Pub. Date: Apr. 20, 2017

(65) Prior Publication Data
US 2018/0340458 A1    Nov. 29, 2018

(30) Foreign Application Priority Data
Oct. 16, 2015   (JP) .................. 2015-204217

(51) Int. Cl.
*F01N 3/28* (2006.01)
*F01N 3/20* (2006.01)
(Continued)

(52) U.S. Cl.
CPC ....... *F01N 3/2892* (2013.01); *B01D 53/9418* (2013.01); *B01D 53/9436* (2013.01);
(Continued)

(58) Field of Classification Search
None
See application file for complete search history.

(56) References Cited

U.S. PATENT DOCUMENTS

2015/0258495 A1* 9/2015 Yokoyama ............ F01N 3/2053
                                                                422/180

FOREIGN PATENT DOCUMENTS

| JP | 05-272334 A | 10/1993 | |
| JP | 05272334 A * | 10/1993 | ........... F01N 3/2053 |

(Continued)

OTHER PUBLICATIONS

Sera, H. (JP05-272334A)—translated document (Year: 1993).*

(Continued)

*Primary Examiner* — Walter D. Griffin
*Assistant Examiner* — Jelitza M Perez
(74) *Attorney, Agent, or Firm* — Norton Rose Fulbright US LLP

(57) ABSTRACT

An exhaust gas purification device for a ship including: a main path communicated with outside and a bypass path branching off from a midway portion of the main path, each of the paths serving as an exhaust gas path of an engine to be mounted in the ship. A partition plate, by which the main and bypass paths are partitioned from the upstream side to the downstream side in an exhaust gas traveling direction, extends along the exhaust gas traveling direction. The partition plate has a downstream end extended through between an exhaust gas outflow port of the purification casing and an exhaust gas outlet of the main path, and the downstream end is formed with an opening to serve as a reverse-flow prevention plate.

15 Claims, 21 Drawing Sheets

(51) Int. Cl.
*B01D 53/94* (2006.01)
*B63H 21/34* (2006.01)
*F01N 3/031* (2006.01)
*F01N 3/08* (2006.01)
*F01N 3/10* (2006.01)
*F01N 3/18* (2006.01)
*F01N 3/24* (2006.01)
*F01N 13/00* (2010.01)

(52) U.S. Cl.
CPC .............. *B63H 21/34* (2013.01); *F01N 3/031* (2013.01); *F01N 3/08* (2013.01); *F01N 3/106* (2013.01); *F01N 3/18* (2013.01); *F01N 3/20* (2013.01); *F01N 3/2066* (2013.01); *F01N 3/24* (2013.01); *F01N 13/0097* (2014.06); *F01N 2240/36* (2013.01); *F01N 2410/00* (2013.01); *F01N 2590/02* (2013.01); *F01N 2610/02* (2013.01); *F01N 2610/11* (2013.01); *F01N 2610/1453* (2013.01); *Y02T 10/24* (2013.01)

(56) References Cited

FOREIGN PATENT DOCUMENTS

| | | | |
|---|---|---|---|
| JP | 2006-341742 | A | 12/2006 |
| JP | 2007-002765 | A | 1/2007 |
| JP | 2010-031746 | A | 2/2010 |
| JP | 2010031746 | A * | 2/2010 |
| JP | 5129400 | B1 | 11/2012 |
| JP | 2015-075042 | A | 4/2015 |
| JP | 2015-086727 | A | 5/2015 |
| WO | 2015064452 | A1 | 5/2015 |

OTHER PUBLICATIONS

Koga, T. (JP2010-031746A)_translated document (Year: 2010).*
International Search Report dated Aug. 9, 2016 issued in corresponding PCT Application PCT/JP2016/065833.

* cited by examiner

EXHAUST GAS PURIFICATION DEVICE FOR SHIP

CROSS REFERENCES TO RELATED APPLICATIONS

This application is a national stage application pursuant to 35 U.S.C. § 371 of International Application No. PCT/JP2016/065833, filed on May 27, 2016, which claims priority under 35 U.S.C. § 119 to Japanese Patent Application No. 2015-204217, filed on Oct. 16, 2015, the disclosures of which are hereby incorporated by reference in their entireties.

TECHNICAL FIELD

The present invention relates to an exhaust gas purification device for removing harmful substances in an exhaust gas discharged from an engine that is to be mounted in a ship.

BACKGROUND ART

Heretofore, ships such as tankers and transport ships include various auxiliary machineries, cargo-handling machines, illumination, air conditioners, and other devices that consume a huge amount of electrical power. In order to supply electricity to these electric systems, the ships include a diesel generator that is a combination of a diesel engine and an electricity generator for generating electrical power when the diesel engine is driven (see, e.g., Patent Literature 1 (hereinafter, PTL1)). It is known that the diesel engine is one of the engines having the highest energy efficiency among internal combustion engines, and the diesel engine emits an exhaust gas containing less carbon dioxide per unit output. Furthermore, the diesel engine can use a low-quality fuel such as heavy oil, which provides an economical advantage.

The exhaust gas from the diesel engine contains carbon dioxide as well as a large amount of substances such as nitrogen oxide, sulfur oxide, and particulate matters. Especially, nitrogen oxide (hereinafter, referred to as NOx) is harmful to a human body and exhibits strong acidity, and is considered to be a cause of acid rain. Machines (such as ships) in which a diesel generator is driven emit a quite large amount of NOx, and therefore are considered to have a great negative effect on the global environment.

As a post-treatment means for greatly purifying NOx, Selective Catalytic Reduction (hereinafter, referred to as SCR), which uses urea as a reducing agent, is commonly used (see, e.g., Patent Literatures 2 and 3 (hereinafter, PTL2 and PTL3)). SCR typically uses a honeycomb-structure NOx catalyst including a support being made of an oxide such as titanium oxide and carrying an active component such as V and/or Cr. When urea water serving as an aqueous reducing agent solution is sprayed to an upstream side of the NOx catalyst, the urea water is thermally decomposed upon heated by an exhaust gas and hydrolyzed, so that ammonia is produced. Ammonia acts on NOx as a reducing agent, and consequently NOx is decomposed into nitrogen and water, which are harmless. PTL2 suggests an exhaust gas purification device including a mixer (exhaust mixer) for mixing an exhaust gas and urea water in order to increase the efficiency of the reduction action of the NOx catalyst.

Considering the global environment, it is necessary to remove NOx in the exhaust gas as much as possible, and it is preferable to regulate NOx emission uniformly both in the high seas and in the territorial seas. Currently, however, along with application of a stricter emission regulation for diesel engines, NOx emission control areas are to be defined in the sea. As described above, the NOx catalyst has a honeycomb structure, and therefore may be clogged with soot and/or particles in the exhaust gas. In addition, the performance of the NOx catalyst may be degraded by sulfur components in the exhaust gas and/or products derived from the sulfur components. In order to extend the service life of the NOx catalyst as long as possible for the purpose of reducing the running cost and achieving compliance with the regulation in the emission control areas in the sea, it is desirable that the NOx catalyst not be exposed to an exhaust gas while the ship is traveling outside the emission control areas.

In order to deal with this, PTL3 proposes an exhaust gas purification device including a purification casing which is disposed in an exhaust gas path of an engine and in which a NOx catalyst is accommodated. In addition, a bypass path causing an exhaust gas to make a detour not to allow the exhaust gas to pass through the NOx catalyst is disposed in the purification casing. In this configuration, an exhaust gas is sent to the NOx catalyst in the purification casing while the ship is traveling in the emission control area, whereas an exhaust gas is sent to the bypass path in the purification casing while the ship is traveling outside the emission control area.

CITATION LIST

Patent Literature

PTL1: Japanese Patent Application Laid-Open No. 2006-341742
PTL2: Japanese Patent Application Laid-Open No. 2015-075042
PTL3: Japanese Patent No. 5129400

SUMMARY OF INVENTION

Technical Problem

In a configuration in which urea water injected by a urea water nozzle on an upstream side in an exhaust gas traveling direction is mixed with an exhaust gas by an exhaust mixer disposed on a downstream side in the exhaust gas traveling direction, a certain distance is necessary between the urea water nozzle and the exhaust mixer in order to adequately diffuse the urea water. If the urea water nozzle is too close to the exhaust mixer, the urea water is not adequately diffused and thus the urea water is concentrated locally in the exhaust mixer. This causes a temperature drop in a part of the exhaust mixer, leading to occurrence of urea precipitation. Furthermore, the inadequate diffusion of the urea water causes a decrease in the efficiency of the reduction (denitrification) action. Meanwhile, if a longer exhaust pipe is employed to achieve a distance between the urea water nozzle and the exhaust mixer, the size of the exhaust gas purification device is increased.

In the configuration in which the bypass path is disposed in the purification casing, a merged chamber in which a main path including the NOx catalyst for carrying out the denitrification action and the bypass path are merged with each other is provided downstream of the purification casing. Thus, when an exhaust gas is caused to pass through the bypass path, the exhaust gas having passed through the bypass path may flow into the main path through the merged chamber in the purification casing, and the exhaust gas may reversely flow into the NOx catalyst. This may decrease the denitrification performance of the NOx catalyst.

Solution to Problem

An aspect of the present invention has an object to provide an exhaust gas purification device for a ship that has been improved as a result of study of the circumstances described above.

According to an aspect of the present invention, an exhaust gas purification device for a ship includes: a main path including a catalyst and a bypass path branching off from a midway of the main path, each of the main path and the bypass path serving as an exhaust gas path of an engine to be mounted in the ship; a purification casing in which the main path and the bypass path are disposed; and parts of the main path and the bypass path are merged with each other for discharging an exhaust gas outside the purification casing, the parts being located downstream in an exhaust gas traveling direction, wherein a partition plate by which the main path and the bypass path are partitioned from each other from an upstream side to a downstream side in the exhaust gas traveling direction is disposed in the purification casing and extends along the exhaust gas traveling direction, and the partition plate has a downstream end extending through between an exhaust gas outflow port of the purification casing and an exhaust gas outlet of the main path and having an opening, the downstream end serving as a reverse-flow prevention plate.

The exhaust gas purification device described above may be configured such that the reverse-flow prevention plate is a perforated plate having the opening constituted by multiple holes. In this configuration, the opening may be provided in a part of an inner portion of the reverse-flow prevention plate.

The exhaust gas purification device described above may be configured such that the exhaust gas outflow port is in a location close to the main path or in a location close to the bypass path.

The exhaust gas purification device described above may be configured such that a reducing agent injector of a reducing agent supply device for supplying a reducing agent to an exhaust gas is disposed in a part in the main path, the part being located upstream of the catalyst in the exhaust gas traveling direction, and cooled air is supplied to the reducing agent injector while the exhaust gas is passing through the bypass path.

The exhaust gas purification device described above may be an exhaust gas purification device including: at least one reducing agent injector of a reducing agent supply device for supplying a reducing agent to an exhaust gas passing through an exhaust pipe of an engine to be mounted in a ship; an exhaust mixer for mixing the exhaust gas and the reducing agent in a location downstream of the at least one reducing agent injector in an exhaust gas traveling direction; and a selective catalytic reduction device for facilitating reduction of NOx in the exhaust gas of the engine in a location downstream of the exhaust mixer in the exhaust gas traveling direction, wherein the at least one reducing agent injector includes a plurality of reducing agent injectors, and the reducing agent injectors respectively have injection ports arranged at equal intervals along a circumferential direction of the exhaust pipe. With this configuration, by injecting the reducing agent by the plurality of reducing agent injectors dispersedly, the reducing agent can be injected in a diffused manner. Furthermore, by the exhaust mixer disposed on a downstream side, the reducing agent can be further diffused in the exhaust pipe. Thus, it is possible to sufficiently mix the exhaust gas having passed through the exhaust mixer and the reducing agent, and hence to increase the reduction efficiency of the catalyst.

The exhaust mixer may include a plurality of mixing fins arranged at equal intervals along the circumferential direction of the exhaust pipe, wherein the injection ports of the reducing agent injectors may be located in positions that coincide with the positions of corresponding ones of the mixing fins along the circumferential direction of the exhaust pipe. With this configuration, when the reducing agent injectors inject the reducing agent through the injection ports toward the downstream side, the reducing agent can be injected toward the mixing fins of the exhaust mixer. Thus, by injecting the reducing agent by the plurality of reducing agent injectors dispersedly, the reducing agent can be injected in a diffused manner. Furthermore, the reducing agent having been injected comes in contact with the mixing fins, and thus the reducing agent is further dispersed. Consequently, the distribution amount of the reducing agent in the exhaust mixer can be made uniform. This increases the mixing efficiency of the exhaust gas and the reducing agent and reduces a temperature drop in a part of the exhaust mixer, thereby increasing the reduction efficiency of the catalyst.

The exhaust gas purification device described above may be configured such that the injection ports of the reducing agent injectors are disposed in positions where the injection ports overlap upstream tip ends of corresponding ones of the mixing fins on respective straight lines along the exhaust gas traveling direction. In addition, the injection ports of the reducing agent injectors may be disposed in a center region between the center of the exhaust pipe and the inner peripheral surface of the exhaust pipe.

Advantageous Effects of Invention

According to an aspect of the present invention, the exhaust gas having passed through the bypass path is guided to the exhaust gas outflow port along the reverse-flow prevention plate, and is then discharged from the purification casing. In addition, due to the reverse-flow prevention plate disposed between the downstream outlet of the main path and the exhaust gas outflow port, a phenomenon that the exhaust gas having passed through the bypass path flows into the main path can be reduced. Consequently, it is possible to reduce a decrease in the denitrification performance of the NOx catalyst in the purification casing.

In addition, according to an aspect of the present invention, the reverse-flow prevention plate has, in its inner portion, an opening through which a region close to the outlet of the main path is communicated with the exhaust gas outflow port. With the opening configured as such, a pressure resistance caused by the reverse-flow prevention plate can be reduced in the region close to the outlet of the main path, and hence a pressure loss in the main path can be reduced.

DESCRIPTION OF EMBODIMENTS

Embodiments of the present invention will be described below with reference to the drawings illustrating cases where the present invention is applied to a diesel generator mounted in a ship.

(Summary of Ship)

Figure 1:
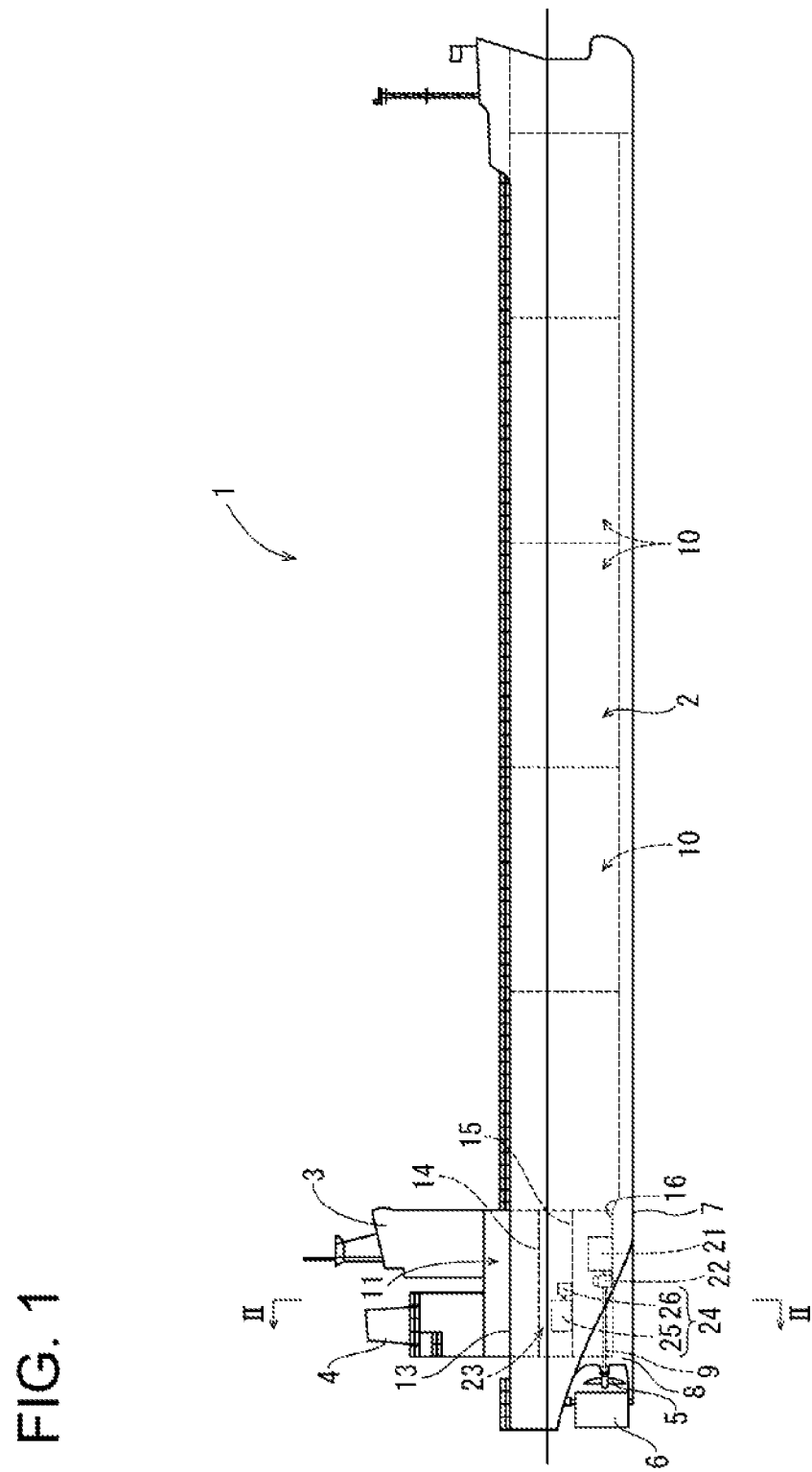
FIG. 1 A side view of an entire ship.

First, with reference to FIG. 1, a summary of a ship 1 according to a first embodiment will be described. The ship 1 according to the first embodiment includes a ship's hull 2, a cabin 3 (bridge) provided, in the ship's hull 2, at a location close to the stern, a funnel 4 (chimney) placed rearward of the cabin 3, and a propeller 5 and a rudder 6 provided in a rear lower part of the ship's hull 2. In this configuration, a skeg 8 is integrally provided to a part of the bottom 7 of the ship, the part being close to the stern. The skeg 8 pivotally supports a propulsion shaft 9 configured to rotate the propeller 5. A ship's hold 10 is provided in a region of the ship's hull 2, the region including a part close to the bow and a middle part of the ship's hull 2. An engine room 11 is provided, in the ship's hull 2, at a location close to the stern.

In the engine room 11, a main engine 21 (a diesel engine, in the first embodiment) that is a driving source of the propeller 5, a speed reducer 22, and an electricity generating unit 23 for supplying electricity to electric systems in the ship's hull 2 are disposed. The propeller 5 is rotated by rotation power transmitted from the main engine 21 via the speed reducer 22. The interior of the engine room 11 is divided vertically by an upper deck 13, a second deck 14, a third deck 15, and an inner bottom plate 16. In the first embodiment, the main engine 21 and the speed reducer 22 are placed on the inner bottom plate 16, which is the lowermost floor of the engine room 11, and the electricity generating unit 23 is placed on the third deck 15, which is a middle floor of the engine room 11. The ship's hold 10 is partitioned into a plurality of sections (detailed illustration thereof is omitted).

Figure 2:
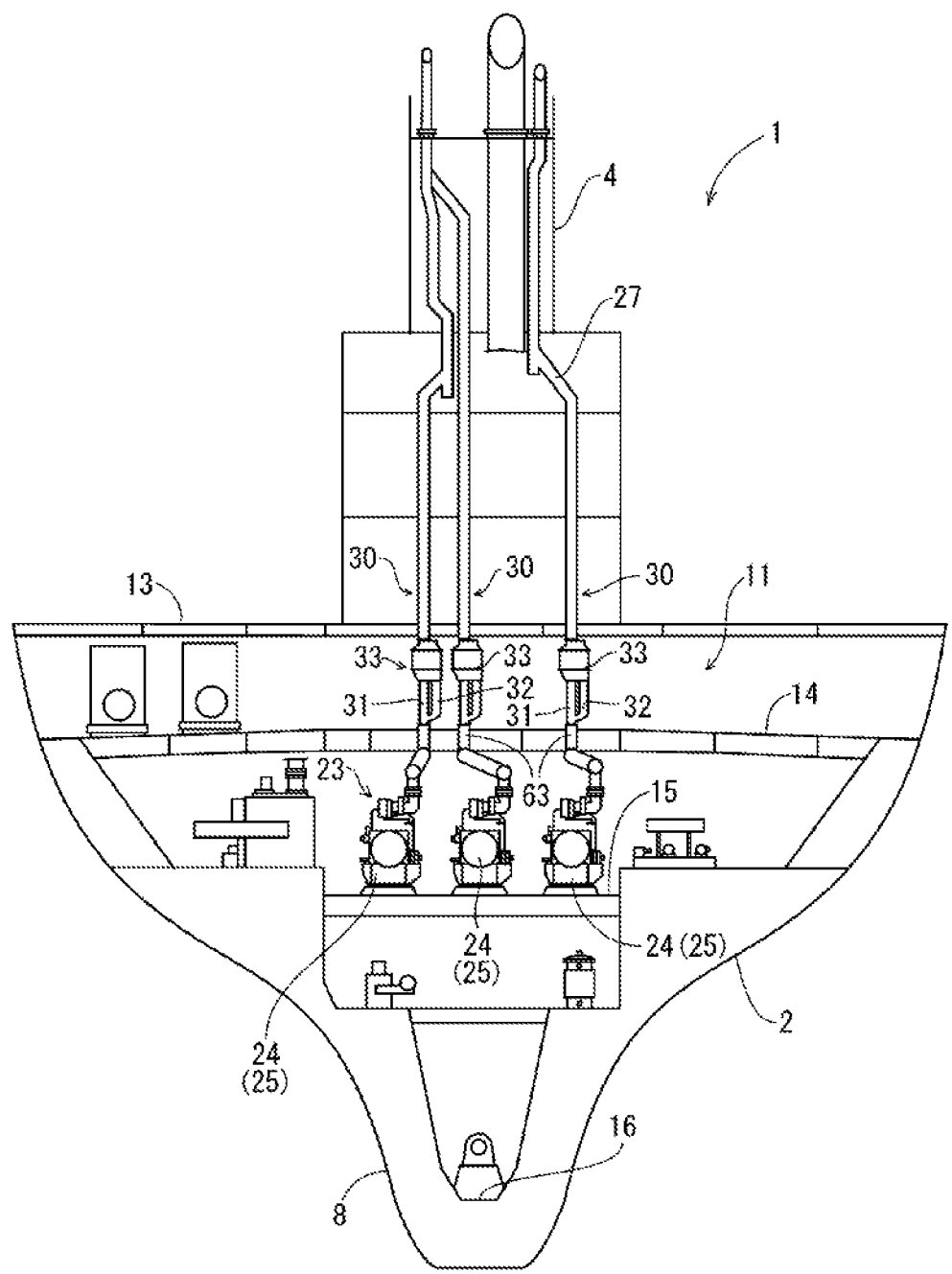
FIG. 2 A front sectional view taken along line II-II of FIG. 1.
Figure 3:
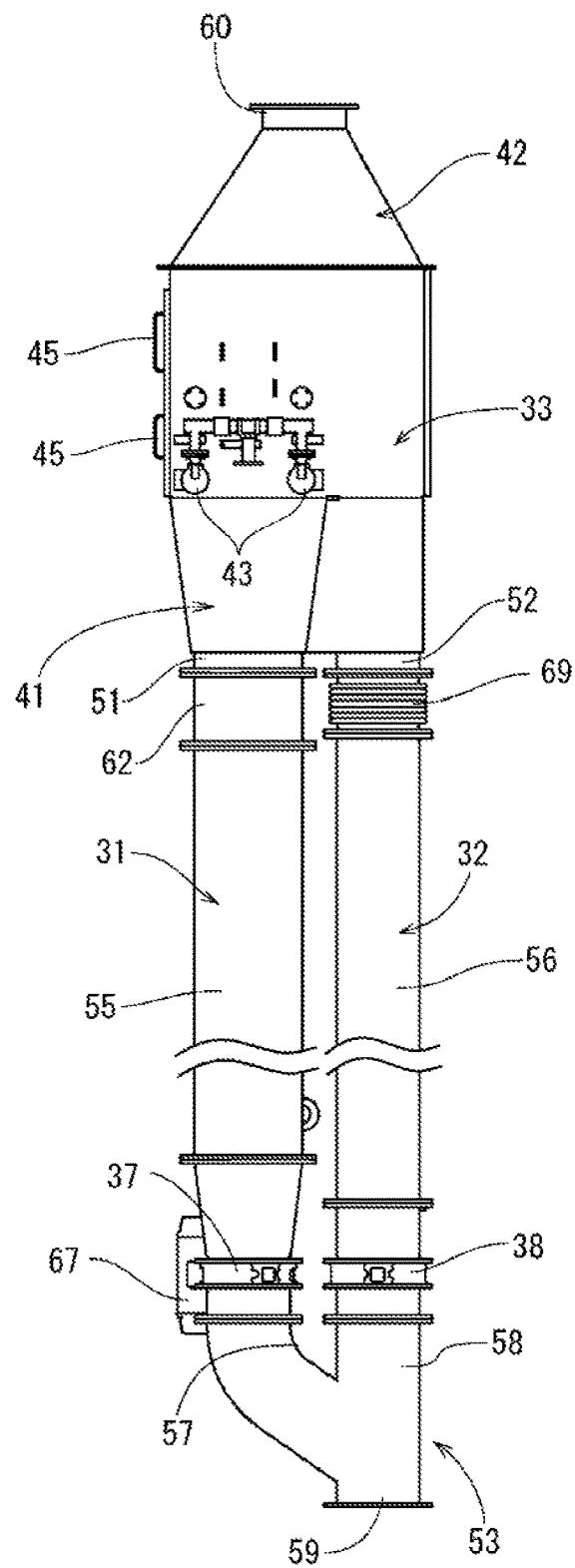
FIG. 3 A front view of a combined casing.
Figure 4:
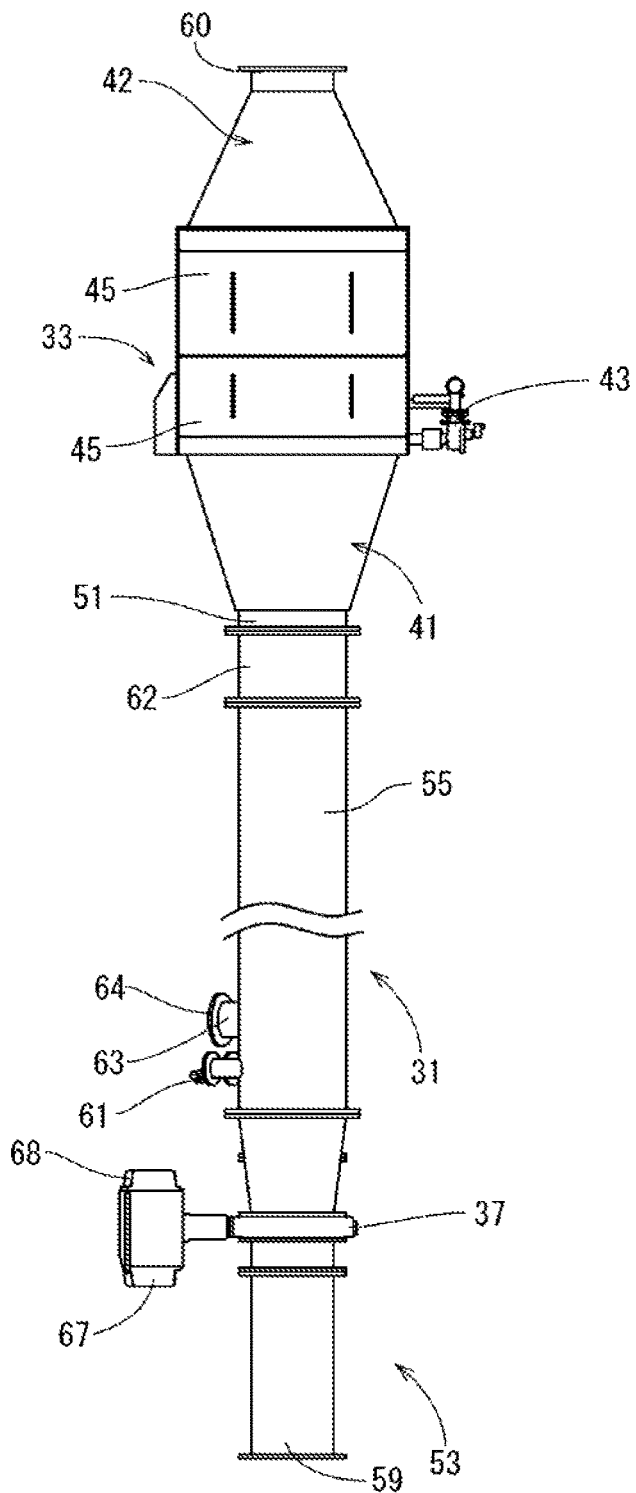
FIG. 4 A side view of the combined casing.
Figure 5:
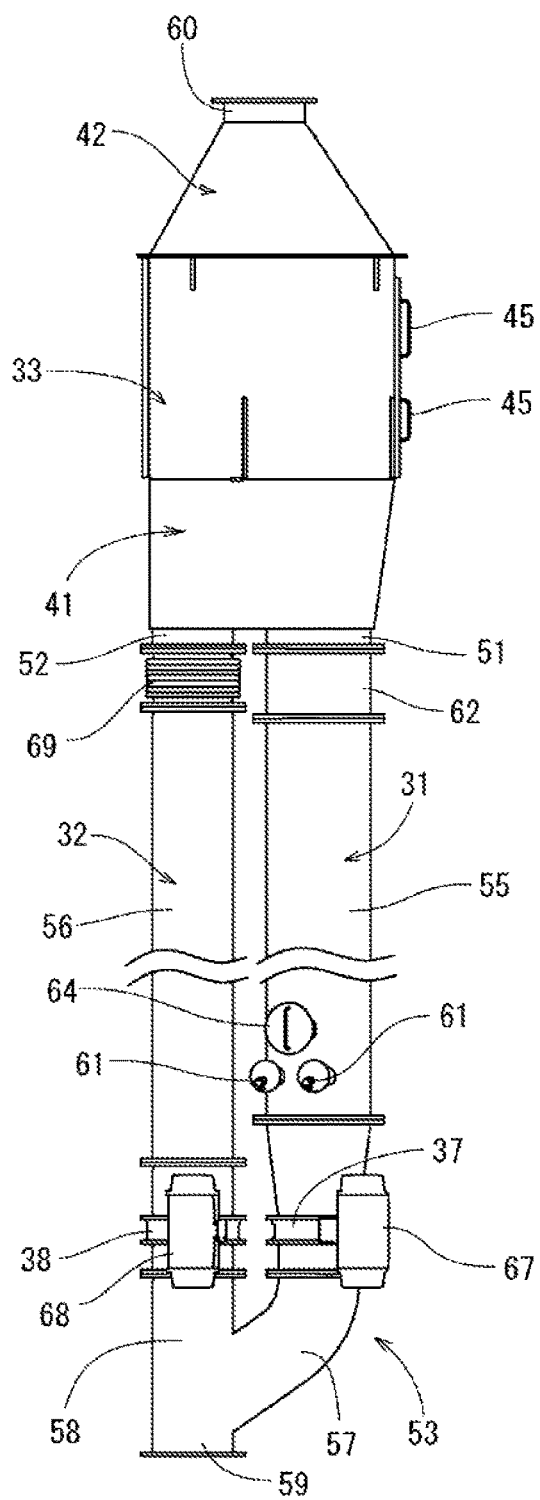
FIG. 5 A back view of the combined casing.
Figure 6:
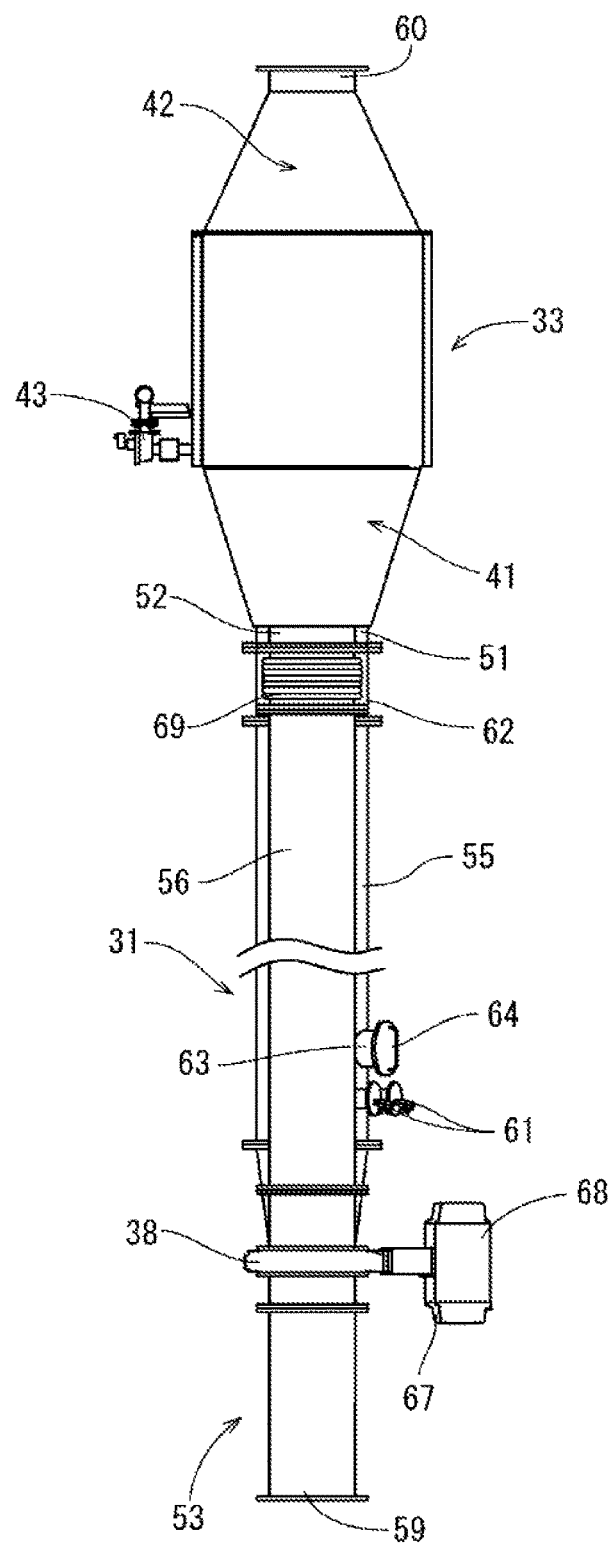
FIG. 6 A side view of the combined casing.

As illustrated in FIG. 2, the electricity generating unit 23 includes a plurality of (three, in the first embodiment) diesel generators 24. Each of the diesel generator 24 is a combination of an electricity-generating engine 25 (a diesel engine, in the first embodiment) and an electricity generator 26 for generating electricity when the electricity-generating engine 25 is driven. Basically, the diesel generator 24 is configured to operate efficiently according to an amount of electricity required in the ship's hull 2. For example, when the ship consumes a huge amount of electricity, e.g., when the ship leaves or enters a port, multiple diesel generators 24 are operated. Meanwhile, when the ship consumes relatively less electricity, e.g., while the ship is at anchor, arbitrary one or some of the diesel generators 24 are operated. Electricity generated as a result of operation of the electricity generators 26 is supplied to the electric systems in the ship's hull 2. An electric power transducer is electrically connected to each electricity generator 26 (detailed illustration thereof is omitted). The electric power transducer is configured to detect electricity generated by the electricity generator 26.

(Exhaust System of Electricity Generating Unit)

Next, with reference to FIGS. 2 to 7, an exhaust system of the electricity generating unit 23 will be described. The electricity-generating engines 25 are connected to respective intake paths (not illustrated) for taking air and respective exhaust gas paths 30 for discharging an exhaust gas. The air taken through each intake path is supplied to cylinders (cylinders on the intake stroke) in its respective electricity-generating engine 25. Upon completion of the compression stroke in the cylinders, fuel sucked from a fuel tank is sent, under pressure, into respective combustion chambers in the cylinders by fuel injection devices. Then, following self-ignition combustion of an air-fuel mixture, the expansion stroke takes place in the combustion chambers.

The exhaust gas paths 30 of the electricity-generating engines 25 extend to the funnel 4 to be directly communicated with outside. As described above, since the number of electricity-generating engines 25 is three, the number of exhaust gas paths 30 is three. The exhaust gas path 30 of each of the electricity-generating engines 25 includes a main path 31 extending to the funnel 4, a bypass path 32 branching off from a midway of the main path 31, and a combined casing (purification casing) 33 communicated with both of the main path 31 and the bypass path 32. Namely, in the first embodiment, multiple electricity-generating engines 25 are provided, and an exhaust gas purification system including components such as the main path 31, the bypass path 32, and the combined casing 33 is provided for each of the electricity-generating engines 25 in a one-to-one relation.

The combined casing 33 is made of a heat-resistant metallic material and is shaped in a substantial cylinder (a prismatic cylinder, in the first embodiment). The combined casing 33 is disposed upward of the third deck 15, on which the electricity-generating engines 25 are placed. In this configuration, the combined casing 33 is located in an upper part of the engine room 11 (on the second deck 14, which is an upper floor of the engine room 11). In a part of the combined casing 33 corresponding to the main path 31 (hereinafter, such a part is referred to as a main path 31 side), a NOx catalyst 34 and a slip processing catalyst 35 (described in detail later) serving as a selective catalytic reduction device that facilitates reduction of NOx in an exhaust gas from the electricity-generating engine 25 are accommodated. The bypass path 32 is a path for causing the exhaust gas to make a detour not to allow the exhaust gas to pass through the NOx catalyst 34 and the slip processing catalyst 35. In an exhaust gas outlet 42 (i.e., a downstream side that is downstream of the slip processing catalyst 35 in an exhaust gas traveling direction; hereinafter, such a side is referred to simply as a downstream side) of the combined casing 33, the main path 31 and the bypass path 32 are merged with each other. Note that, as the selective catalytic reduction device, the slip processing catalyst 35 may be omitted and the NOx catalyst 34 may be provided alone.

A branched portion between the main path 31 and the bypass path 32 is located outside the combined casing 33. In the branch, a main-side switching valve 37 and a bypass-side switching valve 38, each of which is a fluid-operated switching valve, are provided as a path-switching member for changing the exhaust gas traveling direction from the main path 31 to the bypass path 32, and vice versa. Each of the main-side switching valve 37 and the bypass-side switching valve 38 according to the present embodiment is a single-acting switching valve. As one example of the fluid-operated, single-acting switching valve, a pneumatic butterfly valve may be used as each of the main-side switching valve 37 and the bypass-side switching valve 38. The main-side switching valve 37 is provided on the side of an inlet of the main path 31 to the combined casing 33. The bypass-side switching valve 38 is provided on the side of an inlet of the bypass path 32 to the combined casing 33.

Next, with reference to FIGS. 3 to 7, a configuration of the combined casing 33 will be described. As described above, the combined casing 33 is communicated with both of the main path 31 and the bypass path 32. The main path 31 side in the combined casing 33 accommodates the NOx catalyst 34 for facilitating reduction of NOx in the exhaust gas and the slip processing catalyst 35 for facilitating oxidation of an excessively supplied reducing agent (urea water or an aqueous urea solution; more specifically, ammonia resulting from hydrolysis), which are disposed in series in this order from an upstream side in the exhaust gas traveling direction (hereinafter, such a side is simply referred to as an upstream side). The catalysts 34 and 35 each have a honeycomb structure including a large number of cells partitioned by partition walls being porous (capable of filtering), and contains a catalytic metal such as alumina, zirconia, vanadia/titania, or zeolite.

The NOx catalyst 34 selectively reduces NOx in an exhaust gas by using, as a reducing agent, ammonia resulting from hydrolysis of urea water from a urea water injection nozzle 61 (described later). In this manner, NOx catalyst 34 purifies the exhaust gas having been sent to the main path 31 side in the combined casing 33. The slip processing catalyst 35 oxidizes unreacted (excess) ammonia flowed out of the NOx catalyst 34 to convert ammonia to nitrogen, which is harmless. During this, in the main path 31 side in the combined casing 33, the reactions expressed by the following formulae occur:

$(NH_2)_2CO + H_2O \rightarrow 2NH_3 + CO_2$ (hydrolysis)
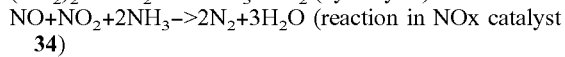
$NO + NO_2 + 2NH_3 \rightarrow 2N_2 + 3H_2O$ (reaction in NOx catalyst 34)
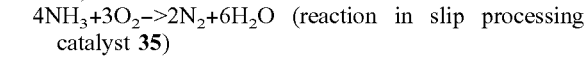
$4NH_3 + 3O_2 \rightarrow 2N_2 + 6H_2O$ (reaction in slip processing catalyst 35)

Figure 7:
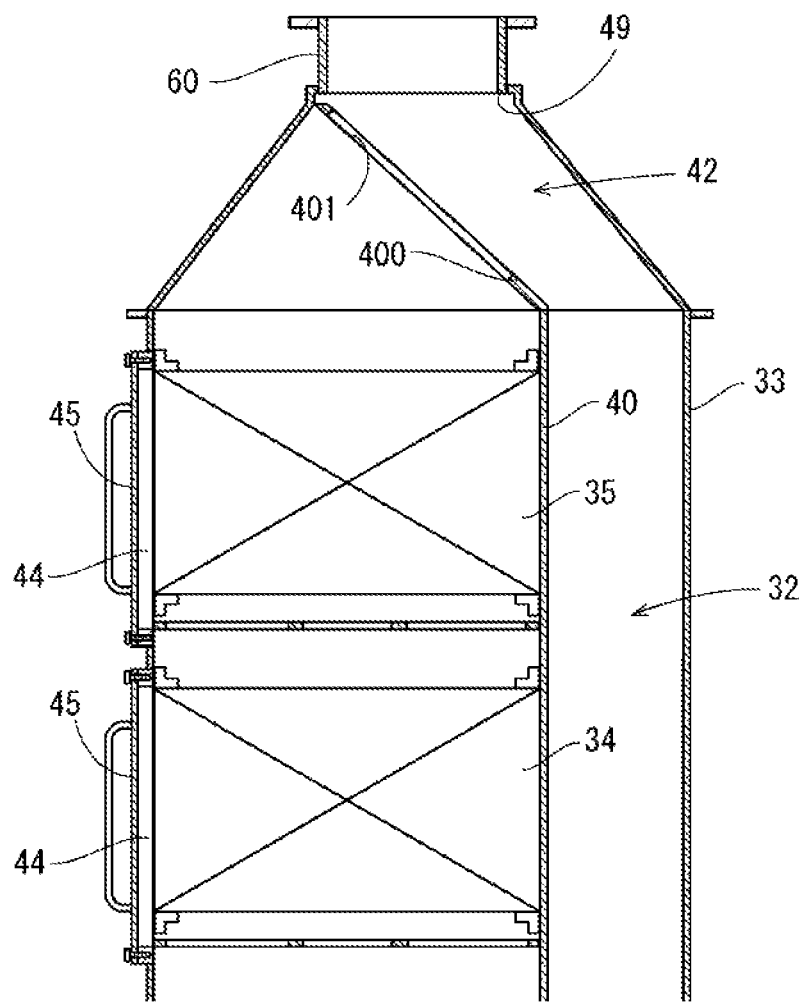
FIG. 7 A sectional view of an outlet of the combined casing.
Figure 8:
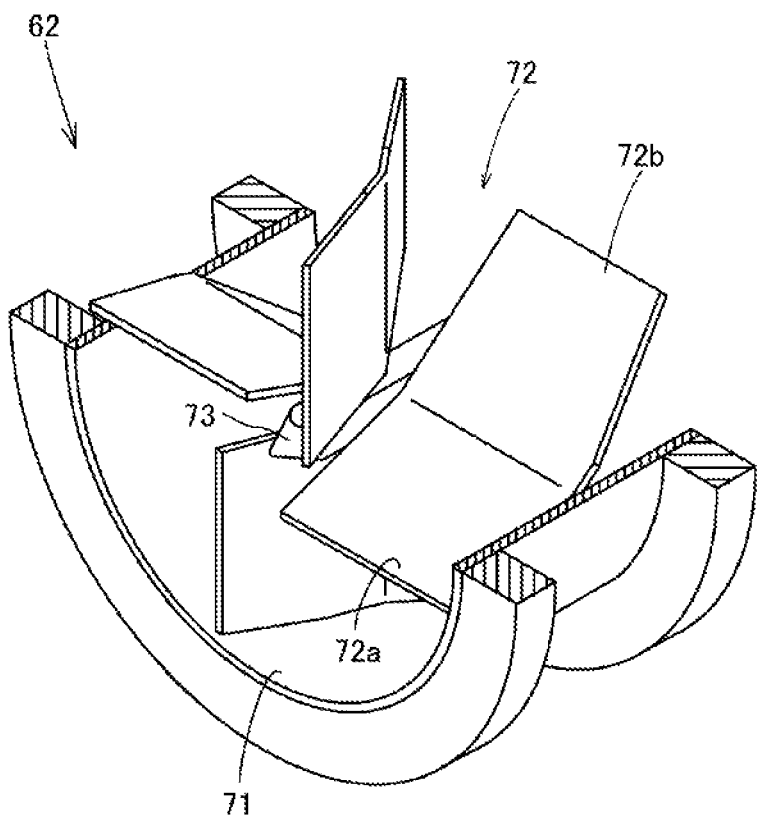
FIG. 8 A perspective sectional view illustrating an internal configuration of an exhaust mixer.

As illustrated in detail in FIG. 7, the main path 31 and the bypass path 32 are disposed side by side in the combined casing 33. In this configuration, a partition plate 40 extending along the exhaust gas traveling direction is disposed in the combined casing 33. By the partition plate 40 thus provided, the interior of the combined casing 33 is partitioned into the main path 31 side and a bypass path 32 side (i.e., a part of the combined casing 33 corresponding to the bypass path 32). In the configuration in which the interior of the combined casing 33 is partitioned by the partition plate 40, the NOx catalyst 34 and the slip processing catalyst 35, which are disposed in the main path 31 side, can be warmed up by the heat of the exhaust gas while the exhaust gas is passing through the bypass path 32. Thus, it is possible to warm up the NOx catalyst 34 and the slip processing catalyst 35 all the time regardless of whether the exhaust gas is to be purified or not. In the case where the exhaust gas passes through the main path 31, this configuration contributes to shortening of the warming-up period, and may even eliminate the need for the warming-up depending on the circumstances.

A part of an exhaust inlet 41 corresponding to the main path 31 side in the combined casing 33 has a tapered (conical) shape having a cross-sectional area becoming smaller toward the upstream side. Meanwhile, a downstream end 400 of the partition plate 40 is extended, in the combined casing 33, to the exhaust gas outlet 42 located downstream of the slip processing catalyst 35, and has an opening 401. Consequently, the main path 31 side and the bypass path 32 side are merged with each other in the exhaust gas outlet 42 of the combined casing 33.

The exhaust gas outlet 42 of the combined casing 33 has an outflow port (exhaust gas outflow port) 49 in a downstream end of the combined casing 33, and the outflow port 49 is communicated with an exhaust discharge pipe 60. The exhaust gas outlet 42 has a tapered (conical) shape having a cross-sectional area becoming smaller toward the outflow port 49, which is located on the downstream side. The outflow port 49 is located in the center of the downstream end of the combined casing 33. Namely, in the combined casing 33, the outflow port 49 is located in a position where the outflow port 49 overlaps the exhaust side of the main path 31.

The downstream end 400 of the partition plate 40 is extended and is provided in a position where the downstream end 400 covers the outlet of the main path 31, and is fixed to the inner wall surface of the combined casing 33. The downstream end 400 of the partition plate 40 is provided as a reverse-flow prevention plate for preventing a phenomenon that the exhaust gas having flowed from the bypass path 32 into the exhaust gas outlet 42 enters the main path 31 (hereinafter, the downstream end 400 of the partition plate 40 is referred to as the reverse-flow prevention plate 400). The reverse-flow prevention plate 400 is extended from a position which is at a boundary between the main path 31 and the bypass path 32 and which is downstream of the slip processing catalyst 35 toward another position which is in the peripheral edge of the outflow port 49 and which is apart from the bypass path 32. By the opening 401 provided in the reverse-flow prevention plate 400, the main path 31 side and the bypass path 32 side are merged with each other in the exhaust gas outlet 42.

The exhaust gas having passed through the main path 31 reaches the outflow port 49 of the exhaust gas outlet 42 through the opening 401 of the reverse-flow prevention plate 400. Then, the exhaust gas having been purified is discharged from the exhaust discharge pipe 60. Meanwhile, the exhaust gas having passed through the bypass path 32 is guided by the reverse-flow prevention plate 400, and reaches the outflow port 49 of the exhaust gas outlet 42. Thus, the inflow amount into the main path 31 (the amount of the exhaust gas reversely flowing to the main path 31) is reduced, and the exhaust gas is mostly discharged from the exhaust discharge pipe 60. Consequently, it is possible to reduce degradation of the NOx catalyst 34 and the slip processing catalyst 35 in the main path 31 while the bypass path 32 is in use.

The combined casing 33 has a side surface provided with a plurality of injection nozzles 43 each serving as a gas jet. By the injection nozzles 43, a compressed gas (air) from a gas supply source (not illustrated) is blown toward the NOx catalyst 34 and the slip processing catalyst 35. By the action of the injection nozzles 43, it is possible to forcibly remove soot particles accumulated in the main path 31 side in the combined casing 33 while the main path 31 side is in use.

A main-side inflow port and a bypass-side inflow port are provided adjacent to a front surface of the exhaust inlet 41 of the combined casing 33. The main-side inflow port is communicated with the main path 31 side in the combined casing 33, and the bypass-side inflow port is communicated with the bypass path 32 side in the combined casing 33. A main-side introduction pipe 51 communicated with the main-side inflow port and a bypass-side introduction pipe 52 communicated with the bypass-side inflow port are provided adjacent to an outer surface of a front part of the exhaust inlet 41 of the combined casing 33. The main-side introduction pipe 51 and the bypass-side introduction pipe 52 are communicated with a bifurcated pipe 53 via intermediate pipes 55 and 56, respectively. In this configuration, an inlet of the main-side intermediate pipe 55 is fastened to a main-side outlet 57 of the bifurcated pipe 53 via a flange. The other end of the main-side intermediate pipe 55 is communicated with the main-side intermediate pipe 51. An inlet of the bypass-side intermediate pipe 56 is fastened to a bypass-side outlet 58 of the bifurcated pipe 53 via a flange. An outlet of the bypass-side intermediate pipe 56 is fastened to the bypass-side introduction pipe 52 via an adjustable pipe 69 having a bellows structure for length adjustment.

An inlet 59 of the bifurcated pipe 53 is connected to the upstream side of the main path 31 via a flange (detailed illustration thereof is omitted). The bifurcated pipe 53 corresponds to the branched portion between the main path 31 and the bypass path 32. The main-side switching valve 37 is disposed in the main-side outlet 57 of the bifurcated pipe 53, the main-side outlet 57 being communicated with the main path 31 side in the combined casing 33. The bypass-side switching valve 38 is disposed in the bypass-side outlet 58 of the bifurcated pipe 53, the bypass-side outlet 58 being communicated with the bypass path 32 side in the combined casing 33. The outflow port 49 is provided in a location which is adjacent to a rear surface of the exhaust gas outlet 42 of the combined casing 33 and which is close to the main path 31 side. The exhaust discharge pipe 60 communicated with the outflow port 49 is provided in a location adjacent to an outer surface of a rear part of the exhaust gas outlet 42 of the combined casing 33. The exhaust discharge pipe 60 is connected to the downstream side of the main path 31 via a flange.

In a space of the main path 31 between the main-side switching valve 37 and the main-side introduction pipe 51 connected to the combined casing 33, a urea water injection nozzle 61 for injecting urea water that is a reducing agent to an exhaust gas and an exhaust mixer 62 for mixing the exhaust gas and the urea water are disposed in this order from the upstream side. The main-side intermediate pipe 55 includes a plurality of (two, in the first embodiment) urea water injection nozzles 61. In this configuration, the urea water injection nozzles 61 inject urea water in an atomized form into the main-side intermediate pipe 55.

The exhaust mixer 62 is disposed between the main-side intermediate pipe 55 and the main-side introduction pipe 51. The exhaust mixer 62 is located downstream of the urea water injection nozzles 61, which are disposed in the main-side intermediate pipe 55, so that the exhaust mixer 62 is apart from the urea water injection nozzles 61 by a predetermined distance. The predetermined distance in this case is a distance necessary to hydrolyze, in the main-side intermediate pipe 55, urea water having been injected from the urea water injection nozzles 61 into ammonia. As illustrated in FIGS. 8 to 11, the exhaust mixer 62 of the first embodiment includes a mixer tube 71 having a tubular shape with an inner diameter identical to those of the main-side intermediate pipe 55 and the main-side introduction pipe 51, a plurality of (four, in the first embodiment) mixing fins 72 provided to the inner periphery of the mixer tube 71, and an axis center body 73 located at the axis center of the mixer tube 71. The exhaust mixer 62 is configured to cause an exhaust gas and atomized urea water passing through the exhaust mixer 62 to swirl by the mixing fins 72 and the axis center body 73.

The mixing fins 72 are members for turning a flow of an exhaust gas into a swirl flow, and are arranged radially from the center of the mixer tube 71 toward the inner peripheral surface of the mixer tube 71. In this configuration, the edge surfaces of the radially inner sides of the mixing fins 72 are fixed to the axis center body 73, whereas the edge surfaces of the radially outer sides of the mixing fins 72 are fixed to the inner peripheral surface of the mixer tube 71. The mixing fins 72 are located at equal angular intervals along a circumferential direction of the mixer tube 71 (i.e., located point-symmetrically around the axis center body 73). Note that the number of mixing fins 72 is not limited to four of the first embodiment.

Each of the mixing fins 72 has an upstream portion and a downstream portion that have respective predetermined angles relative to the exhaust gas traveling direction (i.e., the direction along the axis center of the mixer tube 71 and the like). Namely, each of the mixing fins 72 is bent in its midway along the exhaust gas traveling direction. In this configuration, each of the mixing fins 72 is bent such that an upstream fin plate 72*a* has an inclination angle $\theta 1$ relative to the exhaust gas traveling direction and a downstream fin plate 72*b* has an inclination angle $\theta 2$ relative to the exhaust gas traveling direction. The inclination angle $\theta 2$ of the downstream fin plate 72*b* is greater than the inclination angle $\theta 1$ of the upstream fin plate 72*a*. Namely, the inclination angles $\theta 1$ and $\theta 2$ of the fin plates 72*a* and 72*b* are set so that an angle on the downstream side is greater than an angle on the upstream side. In other words, the inclination angles $\theta 1$ and $\theta 2$ of the fin plates 72*a* and 72*b* are set so that the mixing fin has an angle becoming greater continuously or step-by-step from the upstream side toward the downstream side.

The axis center body 73, which supports the edge surfaces of the radially inner sides of the mixing fins 72, has an upstream front end having a shape that is tapered (conical) toward its front end and has a cross-sectional area becoming smaller toward the upstream side. In addition, the axis center body 73 has a downstream base end having a shape that is tapered (conical) toward its rear end and has a cross-sectional area becoming smaller toward the downstream side. Consequently, an exhaust gas flowing to the axis center of the mixer tube 71 and/or its surroundings is guided toward the mixing fins 72 located radially outside, by the upstream front end, which has a tapered shape, of the axis center body 73.

Figure 12:
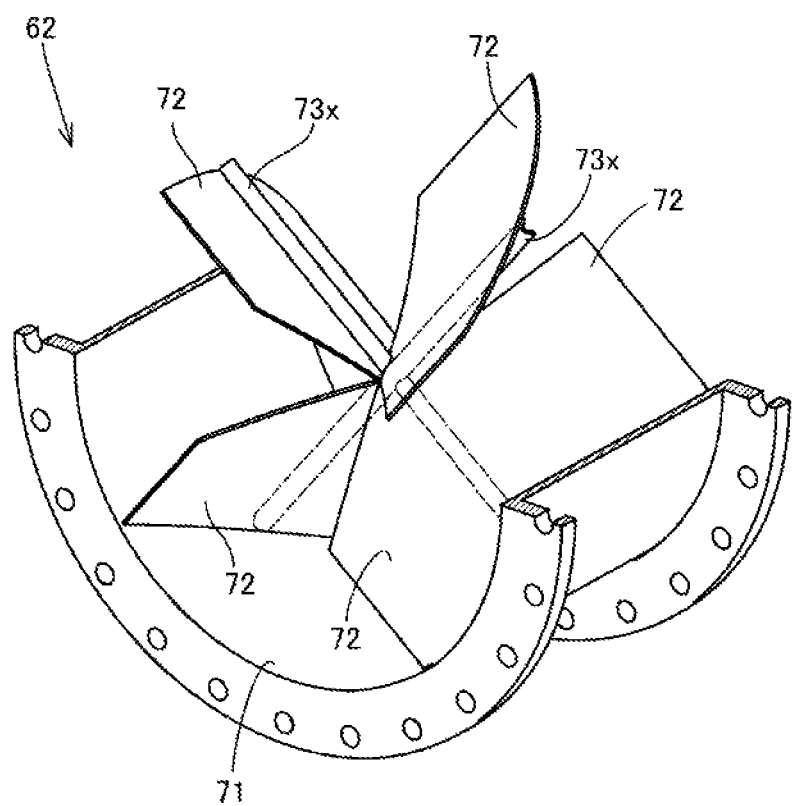
FIG. 12 A perspective sectional view illustrating an internal configuration of an exhaust mixer having a different configuration.

In the present embodiment, the exhaust mixer 62 is configured to include the axis center body 73 to which the mixing fins 72 are fixed. Alternatively, as illustrated in FIG. 12, the exhaust mixer 62 may not include the axis center body 73. Specifically, multiple support stays 73x (two support stays 73x, in the present embodiment) each having a bar shape cross each other and are fixed to each other. In addition, the support stays 73x are disposed so that the intersection of the support stays 73x is aligned with the center of the mixer tube 71. Two mixing fins 72 are fixed to each of the support stays 73x, and the two mixing fins 72 are provided on opposite sides of the intersection of the support stays 73x. Each of the mixing fins 72 has an upstream front end that is an edge side extending from the center of the mixer tube 71 toward the inner peripheral surface of the mixer tube 71. The edge side extends toward the upstream side, and bends in its midway to extend parallel to an opening plane of the mixer tube 71.

The urea water injection nozzles 61 respectively have urea water injection ports 611 located in positions where the urea water injection ports 611 overlap corresponding ones of the mixing fins 72 in the exhaust mixer 62, which is located on the downstream side, when viewed in a cross section of the main path 31 (the main-side intermediate pipe 55). The urea water injection ports 611 of the urea water injection nozzles 61 are arranged at equal intervals (equal angular intervals) along a circumferential direction of the main path 31 (the main-side intermediate pipe 55). The number of urea water injection nozzles 61 corresponds to a divisor of the number of mixing fins 72. The urea water injection ports 611 of the urea water injection nozzles 61 are located in positions that coincide with the positions of corresponding ones of the mixing fins 72 of the exhaust mixer 62, along the circumferential direction of the main path 31 (the main-side intermediate pipe 55 and the mixer tube 71). Note that the number of urea water injection nozzles 61 is not limited to two of the first embodiment.

(Operation of Switching-Over of Gas Path)

The main path 30 and the bypass path 32 in each exhaust gas path 30 are provided with the main-side switching valve 37 and the bypass-side switching valve 38, respectively (in the present embodiment, three sets of switching valves, namely, six switching valves are provided). The main-side switching valve 37 and the bypass-side switching valve 38 serve as opening/closing members for opening and closing the main path 30 and the bypass path 32, respectively. The main-side switching valve 37 and the bypass-side switching valve 38 are configured such that, to select a path through which an exhaust gas passes, one of the main-side switching valve 37 and the bypass-side switching valve 38 is closed when the other is opened. In addition, the main-side switching valve 37 and the bypass-side switching valve 38 are configured to be opened and closed according to the conditions such as the emission control area.

In a state where the bypass-side switching valve 38 is closed and the main-side switching valve 37 is opened, during the exhaust stroke after the expansion stroke, an exhaust gas supplied from each of the multiple electricity-generating engines 25 to its corresponding main path 31 passes through the main path 31 and then through the NOx catalyst 34 and the slip processing catalyst 35, and thereby is subjected to a purification treatment. Then, the exhaust gas is discharged outside the ship 1. Meanwhile, in a state where the main-side switching valve 37 is closed and the bypass-side switching valve 38 is opened, an exhaust gas passes through the corresponding bypass path 32 (without passing through the NOx catalyst 34 and the slip processing catalyst 35), so that the exhaust gas is directly discharged outside the ship 1.

Thus, with the configuration in which the main path 31 and the bypass path 32 in each exhaust gas path 30 are respectively provided with the main-side switching valve 37 and the bypass-side switching valve 38 serving as the opening/closing members for opening and closing the paths 31 and 32, a path through which an exhaust gas passes can be appropriately selected merely by changing open/closed states of the main-side switching valve 37 and the bypass-side switching valve 38 depending on whether the purification treatment on the exhaust gas is necessary or not, e.g., depending on whether the ship is traveling in or outside an emission control area. This enables an efficient treatment on the exhaust gas. Furthermore, for example, in a case where the purification treatment on the exhaust gas is not necessary, the above configuration enables to guide the exhaust gas to the bypass path 32 side, which is directly communicated with outside, while avoiding the exhaust gas passing through the NOx catalyst 34 and the slip processing catalyst 35. Consequently, it is possible to maintain the state with good exhaust efficiency, and thereby to avoid a reduction in outputs of the electricity-generating engines 25. Moreover, in the case where the purification treatment on the exhaust gas is not necessary, this configuration can avoid exposure of the NOx catalyst 34 and the slip processing catalyst 35 to the exhaust gas, and therefore contributes to extension of the service lives of the NOx catalyst 34 and the slip processing catalyst 35.

For a situation in which the electricity-generating engine 25 is stopped, the main-side switching valve 37 and the bypass-side switching valve 38 are configured such that at least the bypass-side switching valve 38 in the bypass path 32 side is closed. Consequently, it is possible to easily and more reliably achieve prevention of a phenomenon that, while one electricity-generating engine 25 is stopped, an exhaust gas discharged from another engine reversely flows into the one electricity-generating engine 25.

As described above, the main-side switching valve 37 and the bypass-side switching valve 38 are fluid-operated switching valves, and are maintained in an open state (normally open) while no fluid is supplied. In addition, a main-side valve driver 67 for performing a switching operation of the main-side switching valve 37 and a bypass-side valve driver 68 for performing a switching operation of the bypass-side switching valve 38 are provided. Each of the main-side valve driver 67 and the bypass-side valve driver 68 is a single-acting pneumatic cylinder. The main-side valve driver 67 is disposed adjacent to the outer periphery of the main-side intermediate pipe 55 and in parallel with the main-side intermediate pipe 55 along a longitudinal direction of the main-side intermediate pipe 55. The bypass-side valve driver 68 is disposed adjacent to the outer periphery of the bypass-side intermediate pipe 56 and in parallel with the bypass-side intermediate pipe 56 along a longitudinal direction of the bypass-side intermediate pipe 56.

Figure 13:
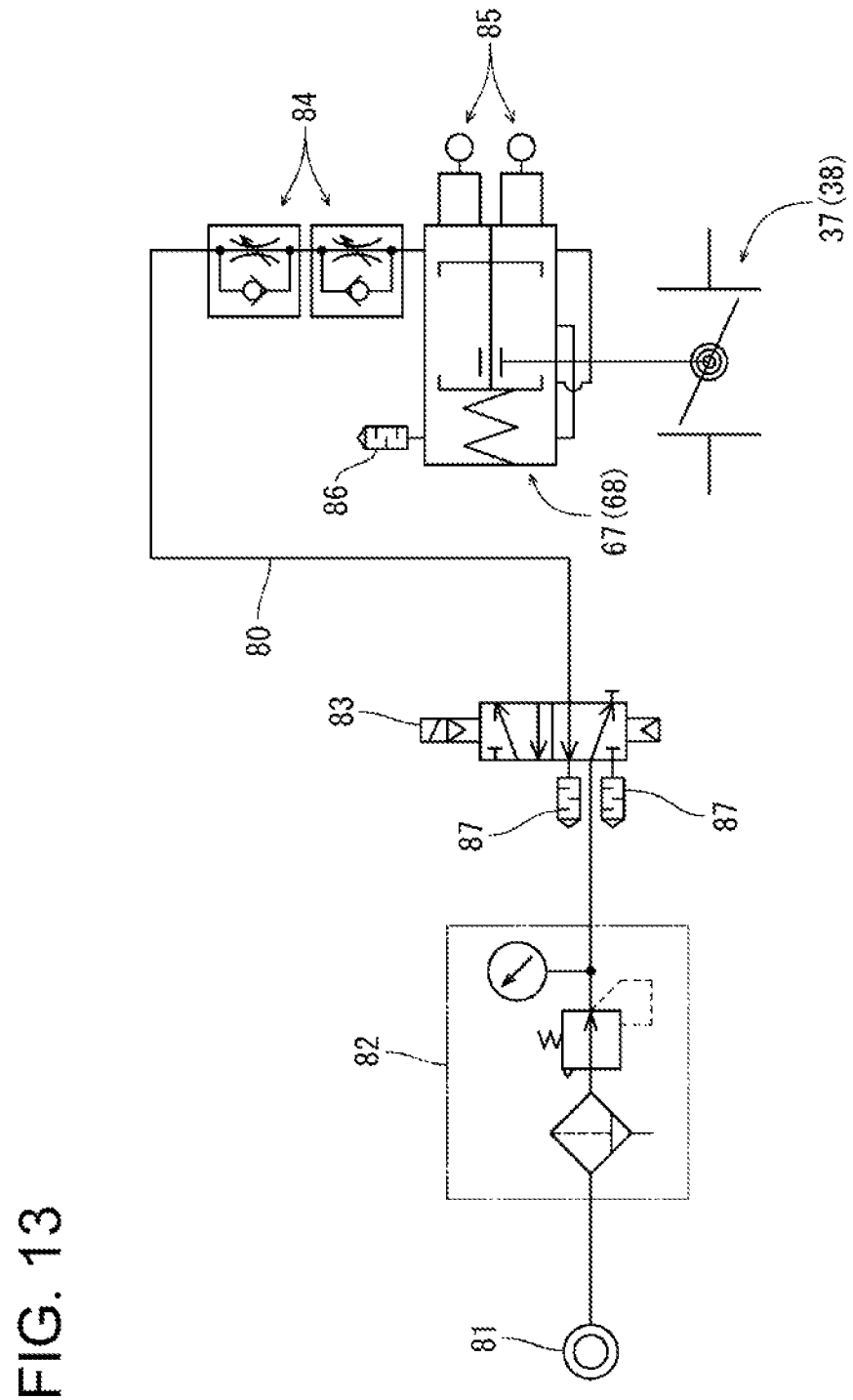
FIG. 13 A circuit diagram of a fluid circulation pipe for which a switching valve is actuated.

As illustrated in FIG. 13, each of the valve driver 67 of the main-side switching valve 37 and the valve driver 68 of the bypass-side switching valve 38 is connected to a fluid supply source 81 via a fluid circulation pipe 80. The fluid supply source 81 is configured to supply air (or a nitrogen gas) that is a compressed fluid for actuating the valve drivers 67 and 68 (i.e., for actuating the main-side switching valve 37 and the bypass-side switching valve 38). In a midway of each of the fluid circulation pipes 80 on the main side and the bypass side, a filter regulator 82, a solenoid valve 83 for switching between a fluid supply mode and a fluid-supply stop mode regarding supply of a fluid to a respective one of the valve drivers 67 and 68, and a flow-rate adjuster 84 including a close-side adjuster and an open-side adjuster are provided in this order from an upstream side. Each solenoid valve 83 operates based on the control information, and is configured to permit or stop supply of a compressed fluid to a corresponding one of the valve driver 67 of the switching valve 37 and the valve driver 68 of the switching valve 38. In addition, each of the valve drivers 67 and 68 is provided with a limit switch 85 for determining whether its corresponding solenoid valve 83 is in a fluid supply mode or in a fluid-supply stop mode. Each of the valve drivers 67 and 68 is connected to a silencer 86. Each of the solenoid valves 83 is connected to a silencer 87.

Figure 14:
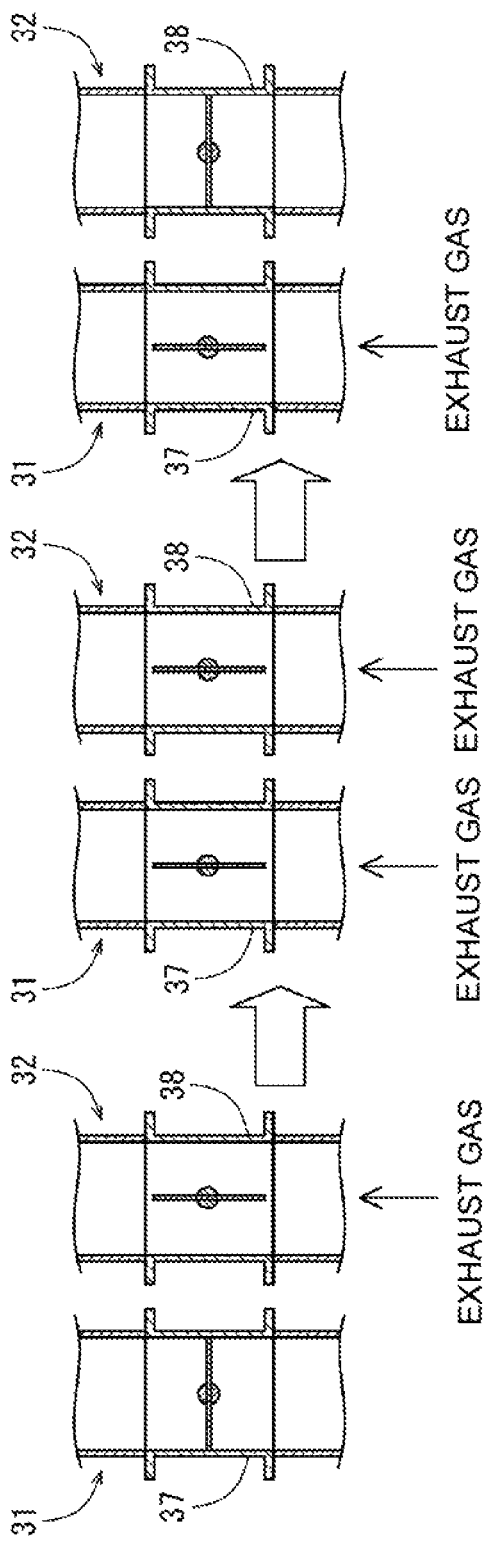
FIG. 14A, FIG. 14B and FIG. 14C Schematic views illustrating how an exhaust gas path is switched from one to another.

A path through which the exhaust gas passes is switched from one to another in the following manner. The solenoid valves 83 in both of the main side and the bypass side enter a fluid-supply stop state, and accordingly fluid supply to the main-side switching valve 37 and the bypass-side switching valve 38 is stopped. The main-side switching valve 37 and the bypass-side switching valve 38 are normally-open switching valves, as described above. Therefore, once the fluid supply is stopped, the main-side switching valve 37 and the bypass-side switching valve 38 are driven by the valve drivers 67 and 68, and accordingly are opened. After that, one of the solenoid valves 83 on the side on which exhaust gas is not to be allowed to pass through enters a fluid supply state, and accordingly the switching valve to which the fluid is supplied is closed. Meanwhile, the other of the solenoid valves 83 on the side on which the exhaust gas is to be allowed to pass through is still in the fluid-supply stop state, and the switching valve remains open. In this manner, a path through which the exhaust gas passes is switched from one to another. As one example, the main-side switching valve 37 and the bypass-side switching valve 38 operate to change from a state in which the main-side switching valve 37 is closed and the bypass-side switching valve 38 is opened (see FIG. 14A) to a state in which both of the main-side switching valve 37 and the bypass-side switching valve 38 are opened (see FIG. 14B) temporarily, and then to a state in which the bypass-side switching valve 38 is closed and the main-side switching valve 37 is opened (see FIG. 14C).

In the configuration described above, in the case where the main-side switching valve 37 is opened and the bypass-side switching valve 38 is closed, the exhaust gas passes through the main path 31. Specifically, an exhaust gas passes through the main-side outlet 57 of the bifurcated pipe 53, the main-side intermediate pipe 55, the exhaust mixer 62, the main-side introduction pipe 51, and the main-side inflow port 47, and enters the main path 31 side in the combined casing 33. Then, the exhaust gas passes through the NOx catalyst 34 and the slip processing catalyst 35, and thereby is subjected to a purification treatment.

In this case, the exhaust gas containing urea water in an atomized form injected from the urea water injection nozzles 61 is guided to the exhaust mixer 62 through the main-side intermediate pipe 55. The upstream fin plate 72a of each mixing fin 72 changes the exhaust gas traveling direction to the direction of the inclination angle θ1, and then the downstream fin plate 72b of the mixing fin 72 further changes the exhaust gas traveling direction to the direction of θ2. Consequently, the exhaust gas containing the urea water flows toward the inner peripheral surface of the mixer tube 71, and accordingly the exhaust gas travels in a circumferential direction along the inner peripheral surface of the mixer tube 71. As a result, the exhaust gas is caused to swirl in the part of the exhaust inlet 41 corresponding to the main path 31 side in the combined casing 33. Thus, the exhaust gas and the urea water are mixed smoothly and efficiently. The part of the exhaust inlet 41 corresponding to the main path 31 side in the combined casing 33 has a tapered (conical) shape having a cross-sectional area becoming smaller toward the upstream side. This increases the swirl diameter of the swirl flow of the exhaust gas. Consequently, the exhaust gas reaches the NOx catalyst 34 provided in the main path 31 side in the combined casing 33, while being mixed with the urea water more uniformly.

(Urea Water Injection Nozzle)

Figure 9:
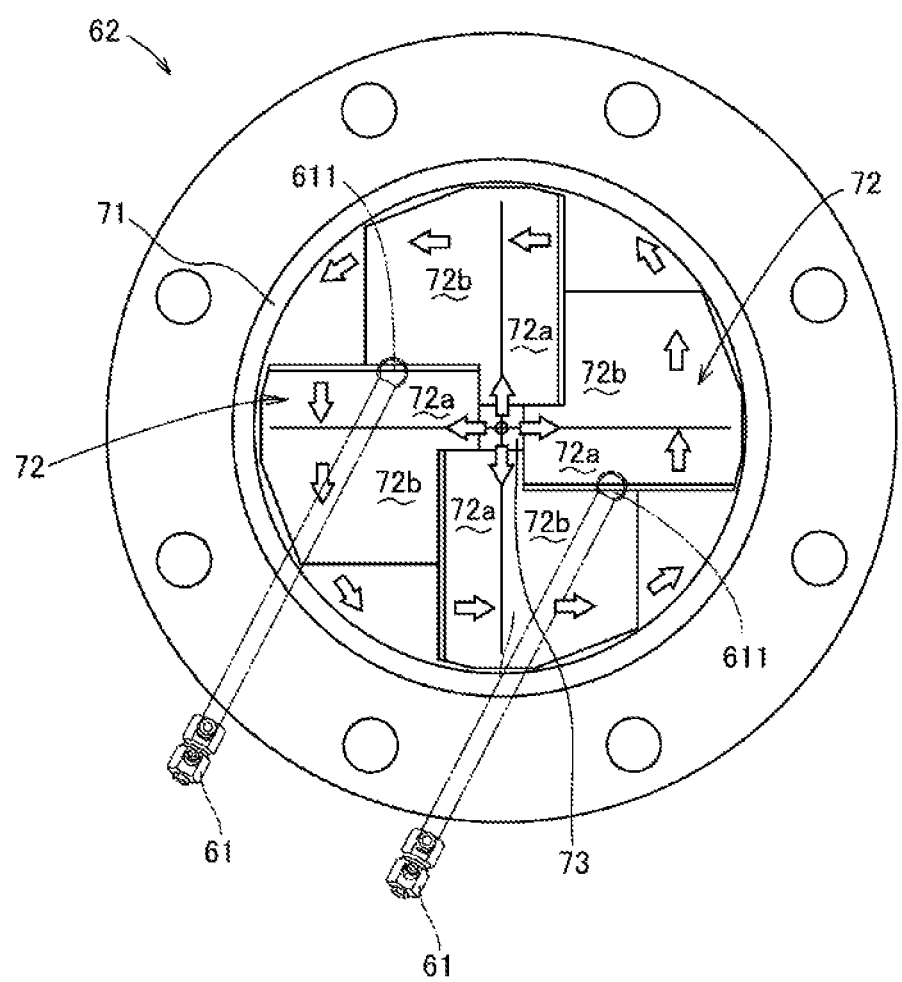
FIG. 9 A front view of the exhaust mixer viewed from an upstream side in an exhaust gas traveling direction.
Figure 10:
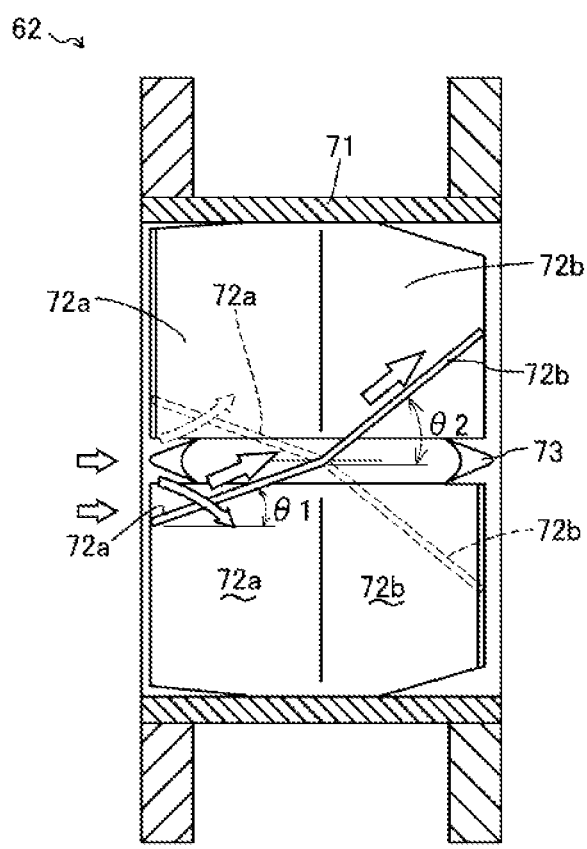
FIG. 10 A side sectional view of the exhaust mixer.
Figure 11:
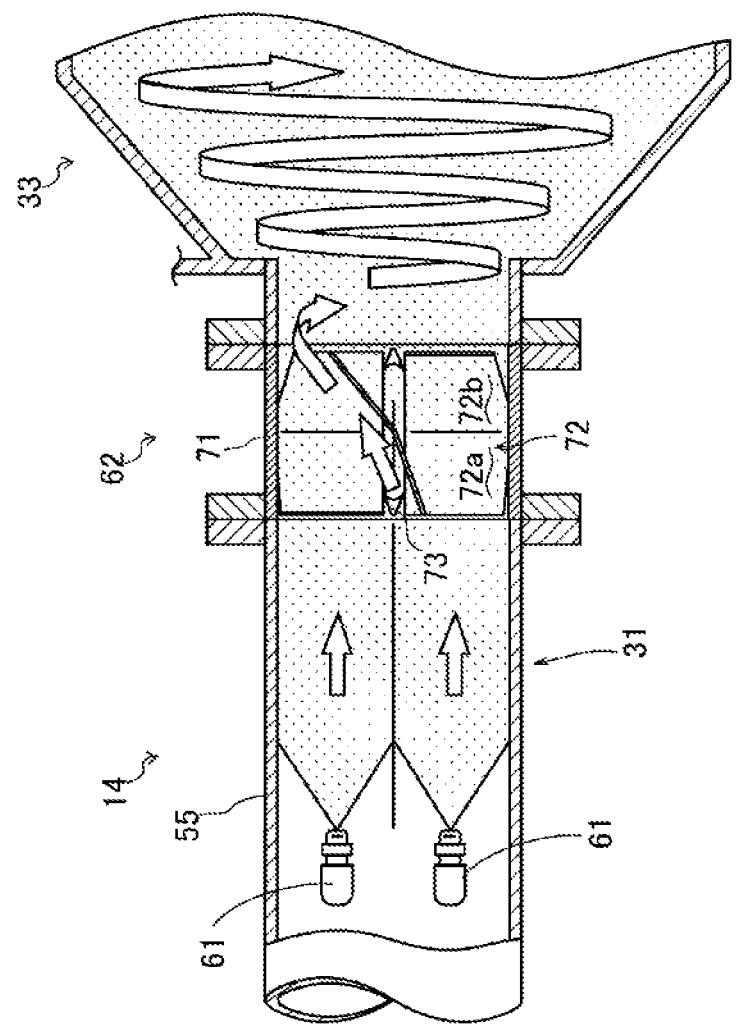
FIG. 11 A side sectional view illustrating a flow of an exhaust gas from the exhaust mixer toward the combined casing.

As illustrated in FIG. 9, the urea water injection nozzles 61 are inserted into the main-side intermediate pipe 55, and the urea water injection nozzles 611 at the tip ends of the urea water injection nozzles 61 are directed to the downstream side. The urea water injection ports 611 are arranged at equal intervals along the circumferential direction of the main-side intermediate pipe 55, and are disposed in positions where the urea water injection ports 611 overlap corresponding ones of the mixing fins 72 in the exhaust mixer 62 located on the downstream side. Consequently, when the urea water injection nozzles 61 inject urea water through the urea water injection ports 611 toward the downstream side, the urea water can be injected toward the mixing fins 72 of the exhaust mixer 62.

Thus, by injecting urea water by the plurality of urea water injection nozzles 61 dispersedly, the urea water can be injected in a diffused manner. Furthermore, the urea water having been injected comes in contact with the mixing fins 72, and thus the urea water is further dispersed. Consequently, the distribution amount of urea water in the exhaust mixer 62 can be made uniform. This increases the mixing efficiency of the exhaust gas and the urea water and reduces a temperature drop in a part of the exhaust mixer 62, thereby reducing occurrence of urea precipitation. Furthermore, since the diffusion efficiency of the urea water is increased, it is possible to reduce the distance between the urea water injection nozzles 61 and the exhaust mixer 62. Therefore, it is possible to use a main-side intermediate pipe 55 having a shorter length.

The urea water injection ports 611 are disposed in positions where the urea water injection ports 611 overlap upstream tip ends of corresponding ones of the mixing fins 72 on respective straight lines along the exhaust gas traveling direction, and the urea water injection ports 611 inject urea water toward the upstream tip ends of the mixing fins 72. Thus, the urea water injected from the urea water injection nozzles 61 comes in contact with the side edges of the upstream tip ends of the mixing fins 72, and consequently the urea water is guided into the exhaust mixer 62 in a diffused manner. Consequently, the dispersion efficiency of the urea water in the exhaust mixer 62 can be increased, and hence the efficiency of purifying the exhaust gas can be increased.

Figure 15:
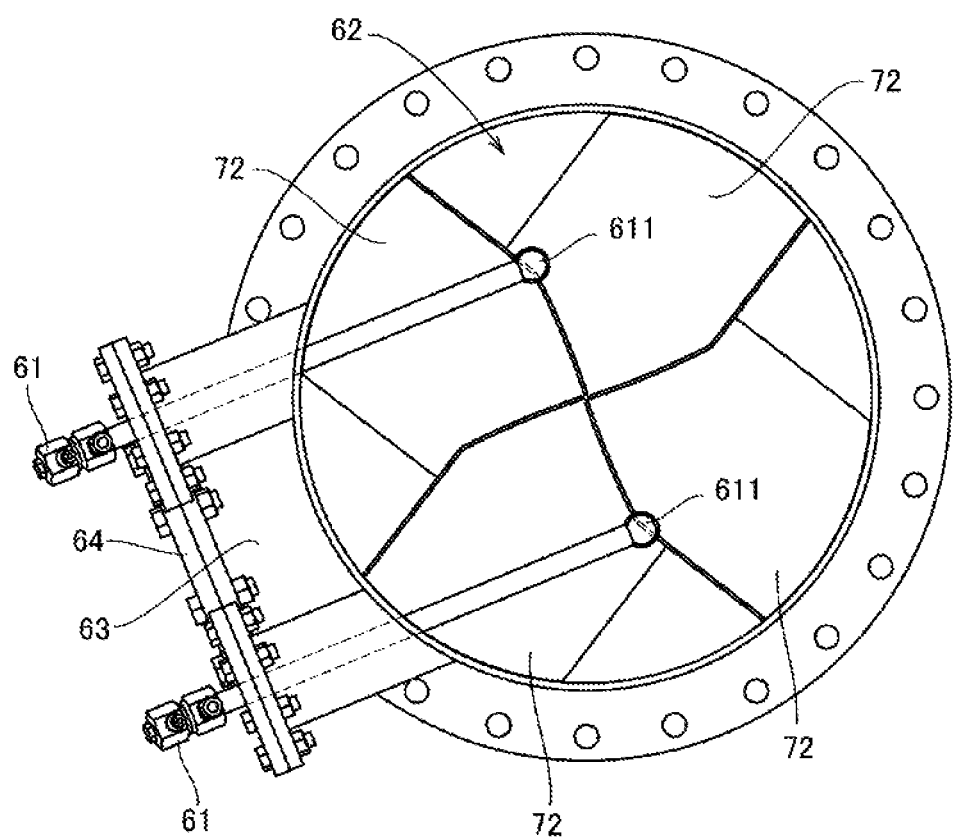
FIG. 15 A front view illustrating a relation between urea water injection nozzles and an exhaust mixer viewed from an upstream side in an exhaust gas traveling direction.

The urea water injection ports 611 of the urea water injection nozzles 61 are disposed in a center region between the center and the inner peripheral surface of the main path 61 (the main-side intermediate pipe 55). Namely, the urea water injection ports 611 are disposed in positions in which the urea water injection ports 611 overlap the upstream tip ends of corresponding ones of the mixing fins 71 and which are in a center region of the upstream tip ends of the mixing fins 72. With this configuration, the urea water having been injected from the urea water injection nozzles 61 is likely to be diffused uniformly in the main path 31. This makes it possible to reduce urea precipitation in the main path 31, the exhaust mixer 62, and/or other parts. In addition, with reference to FIG. 15, in the exhaust mixer 62 configured as illustrated in FIG. 12, the urea water injection ports 611 are disposed in positions where the urea water injection ports 611 overlap corresponding ones of the bent portions of the upstream tip ends of the mixing fins 72.

Figure 16:
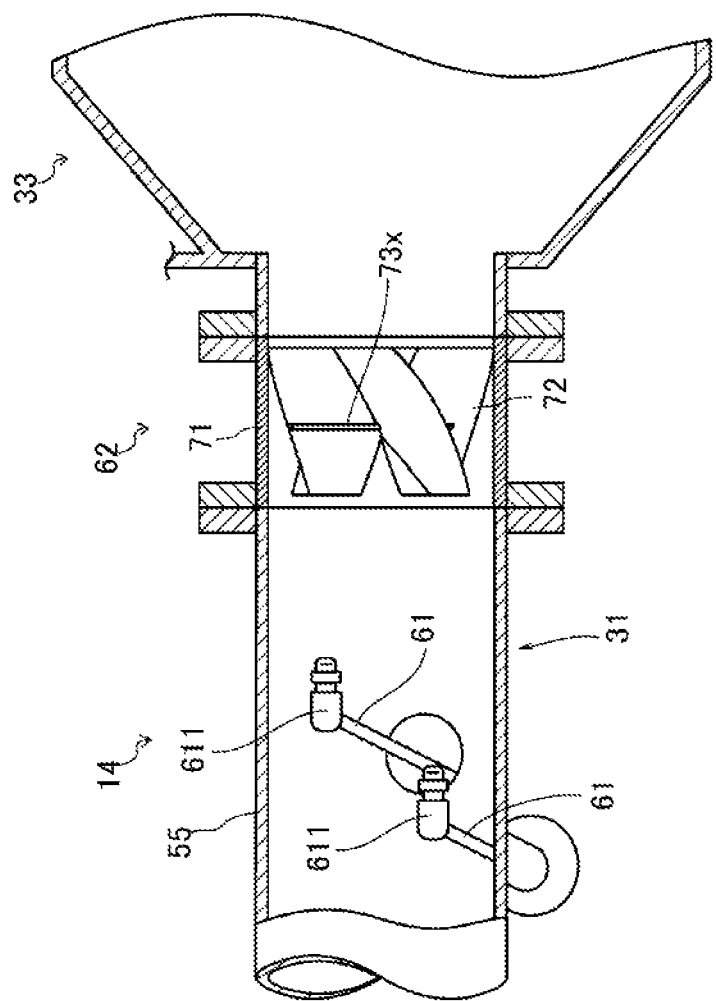
FIG. 16 A side sectional view illustrating a relation between the urea water injection nozzles and the exhaust mixer.

As illustrated in FIG. 16, the urea water injection ports 611 of the urea water injection nozzles 61 may be positioned to be away from the exhaust mixer 62 by different distances in the exhaust gas traveling direction. Namely, since the diffusion efficiency of the urea water is increased by the configuration including the plurality of urea water injection nozzles 61, it is possible to reduce the distance between the urea water injection nozzles 61 and the exhaust mixer 62. Therefore, the urea water injection nozzles 61 can be disposed in different positions in the exhaust gas traveling direction. In addition, the plurality of urea water injection nozzles 61 is inserted into the main-side intermediate pipe 55 in the same direction. This makes it possible to approach the urea water injection nozzles 61 in the same direction relative to the combined casing 33 during the maintenance.

Figure 17:
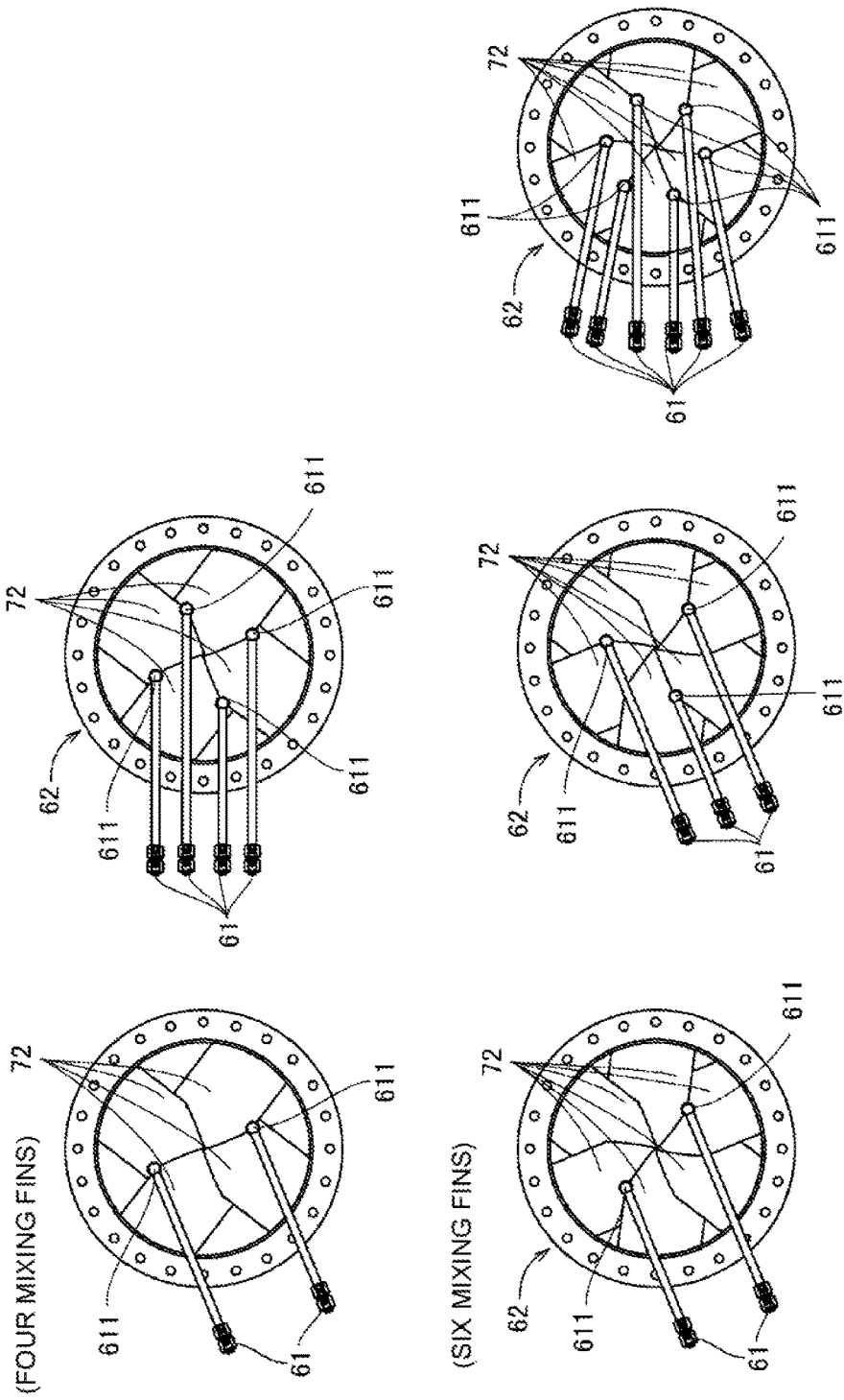
FIG. 17 Schematic front views of other examples of arrangement of urea water injection nozzles and an exhaust mixer viewed from an upstream side in an exhaust gas traveling direction.

As illustrated in FIG. 17, the number of urea water injection nozzles 61 is determined according to the number of mixing fins 72 of the exhaust mixer 62. Specifically, the number of urea water injection nozzles 61 corresponds to a divisor of the number of mixing fins 72 of the exhaust mixer 62, and the urea water injection ports 611 of the urea water injection nozzles 61 are arranged at equal intervals along the main path 31 (the main-side intermediate pipe 55). For example, in a case where the number of mixing fins 72 of the exhaust mixer 62 is four, two or four urea water injection nozzles 61 may be provided. Meanwhile, in a case where the number of mixing fins 72 of the exhaust mixer 62 is six, two, three, or six urea water injection nozzles 61 may be provided.

(Reverse-Flow Prevention Plate)

Figure 18:
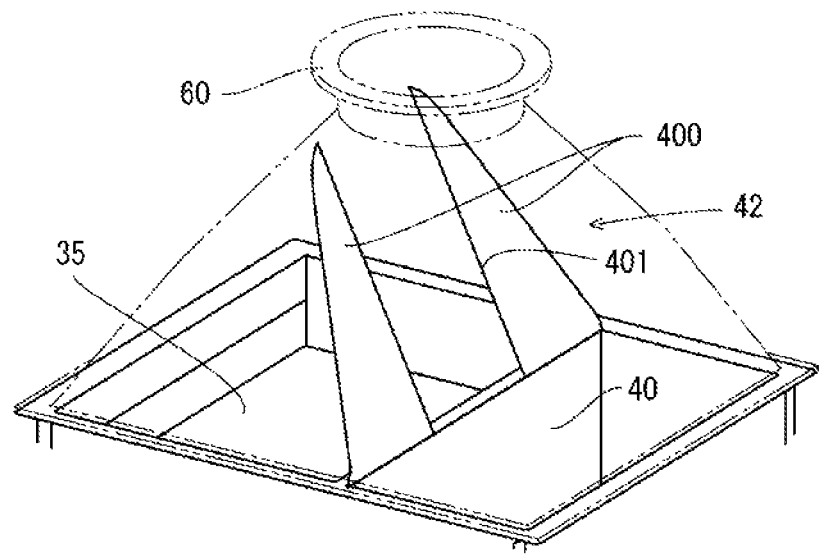
FIG. 18 A perspective view illustrating an internal configuration of a combined casing according to a first embodiment.

As illustrated in FIG. 18, the reverse-flow prevention plate 400 is the downstream end of the partition plate 40 that is extended, in the exhaust gas outlet 42 of the combined casing 33, from a region close to the downstream outlet of the main path 31 toward the peripheral edge of the outflow port 49. The outflow port 49 is disposed in a position where the outflow port 49 overlaps the main path 31. The reverse-flow prevention plate 400 is disposed downstream of the slip processing catalyst 35, and is extended obliquely from the partition plate 40 toward the peripheral edge of the outflow port 49. The peripheral edge of the reverse-flow prevention plate 400 is fixed to the inner wall surface of the combined casing 33.

With this configuration, the exhaust gas having passed through the bypass path 32 is guided, along the reverse-flow prevention plate 400, to the exhaust discharge pipe 60 communicated with the outflow port 49, and is then discharged from the exhaust discharge pipe 60. In addition, due to the configuration in which the reverse-flow prevention plate 400 is located between the downstream outlet of the main path 31 and the outflow port 49, it is possible to reduce a phenomenon that the exhaust gas having passed through the bypass path 32 flows into the main path 31. Consequently, it is possible to reduce degradation of the NOx catalyst 34 and the slip processing catalyst 35, and thereby to keep a high purifying efficiency for a long period.

The reverse-flow prevention plate 400 has, in its inner portion, an opening 401 through which the region close to the outlet of the main path 31 is communicated with the exhaust discharge pipe 60. Namely, the reverse-flow prevention plate 400 is made of two side-edge portions of the downstream end of the partition plate 40, the two side-edge portions being extended along the inner wall surface of the combined casing 33 toward the downstream side and having the opening 401 interposed between the two side-edge portions. With this configuration including the opening 401 that is wide, a pressure resistance caused by the reverse-flow prevention plate 400 can be reduced in the region close to the outlet of the main path 31, and hence a pressure loss in the main path 31 can be reduced.

In addition, while an exhaust gas is passing through the bypass path 32, cooled air is supplied to the urea water injection nozzles 61 to cool the urea water injection nozzles 61. Consequently, the cooled air having passed through the urea water injection nozzles 61 enters the upstream side of the main path 31 and passes through the main path 31. Thus, the cooled air from the urea water injection nozzles 61 passes through the NOx catalyst 34 and the slip processing catalyst 35 in the main path 31. This can reduce a phenomenon that the exhaust gas from the bypass path 32 flows into the main path 31. Consequently, it is possible to reduce degradation of the NOx catalyst 34 and the slip processing catalyst 35, and thereby to keep a high purifying efficiency for a long period.

Second Embodiment

Figure 19:
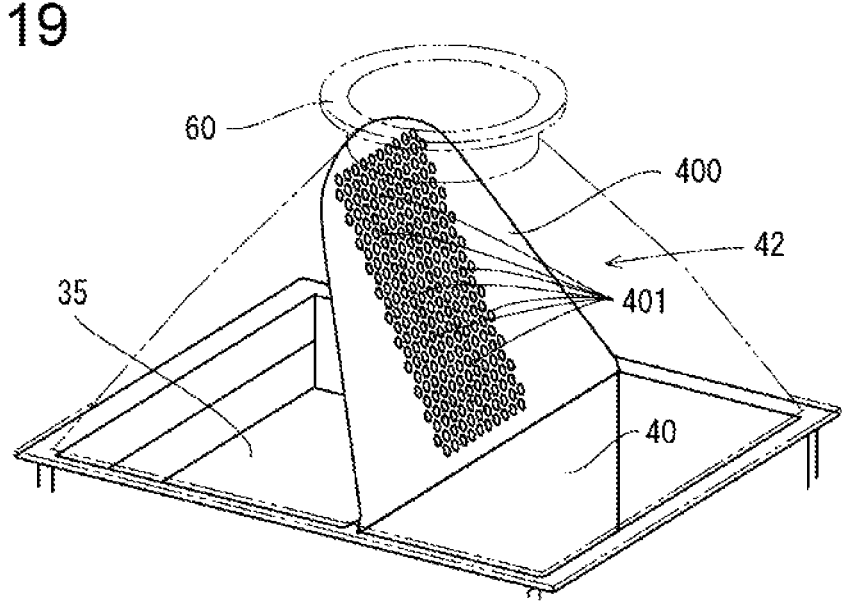
FIG. 19 A perspective view illustrating an internal configuration of a combined casing according to a second embodiment.

A configuration of a reverse-flow prevention plate 400 in a combined casing 33 according to a second embodiment of the present invention will be described below with reference to FIG. 19. In the present embodiment, as illustrated in FIG. 19, the reverse-flow prevention plate 400 provided at a downstream end of a partition plate 40 has an opening 401 constituted by multiple holes. Specifically, the reverse-flow prevention plate 400 is a perforated plate having the opening 401 constituted by multiple holes. In addition, in an exhaust gas outlet 42, the reverse-flow prevention plate 400 is located between a main path 31 and an exhaust discharge pipe 60. The peripheral edge (side edge and downstream-side edge) of the reverse-flow prevention plate 400 is fixed to the inner wall surface of a combined casing 33. In two side-edge regions of the reverse-flow prevention plate 400, no hole is provided, the two side-edge regions being adjacent respectively to two side edges of the reverse-flow prevention plate 400 and being fixed to the inner wall surface of the combined casing 33. Meanwhile, in an inner portion of the reverse-flow prevention plate 400, the holes constituting the opening 401 are provided. The holes constituting the opening are positioned at substantially equal intervals. The shape of the opening is not limited to a circle, but may have another shape such as a triangle or a rectangular.

Consequently, the exhaust gas having passed through the main path 31 is guided, through the holes constituting the opening 401, to an exhaust discharge pipe 60 communicated with an outflow port 49. The exhaust gas is then discharged from the exhaust discharge pipe 60. Meanwhile, the exhaust gas having passed through a bypass path 32 is guided, along the reverse-flow prevention plate 400, to the exhaust discharge pipe 60 communicated with the outflow port 49. The exhaust gas is then discharged from the exhaust discharge pipe 60. Thus, the above configuration can reduce a phenomenon that the exhaust gas having passed through the bypass path 32 flows into the main path 31, and hence can maintain the purifying efficiency. Also, the above configuration can reduce a decrease in exhaust flow rate (pressure loss) in a downstream outlet of the main path 31.

Figure 20:
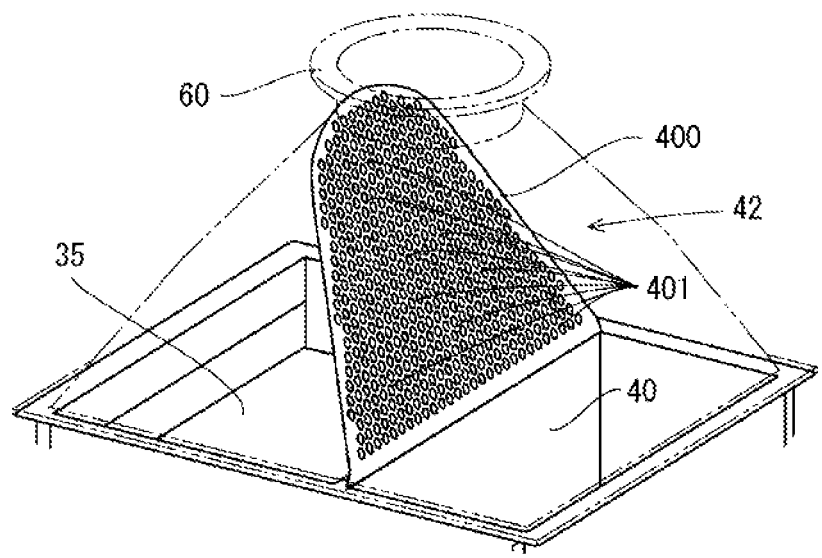
FIG. 20 A perspective view illustrating an internal configuration of another combined casing according to the second embodiment.

In the present embodiment, as illustrated in FIG. 19, the plurality of holes constituting the opening 401 is disposed in a part of the reverse-flow prevention plate 400. Alternatively, as illustrated in FIG. 20, a plurality of holes constituting an opening 401 may be disposed over an entire surface of a reverse-flow prevention plate 40. With the configuration in which the opening 401 is provided in a wide area of the reverse-flow prevention plate 400, a pressure resistance caused by the reverse-flow prevention plate 400 can be reduced in the main path 31.

Third Embodiment

Figure 21:
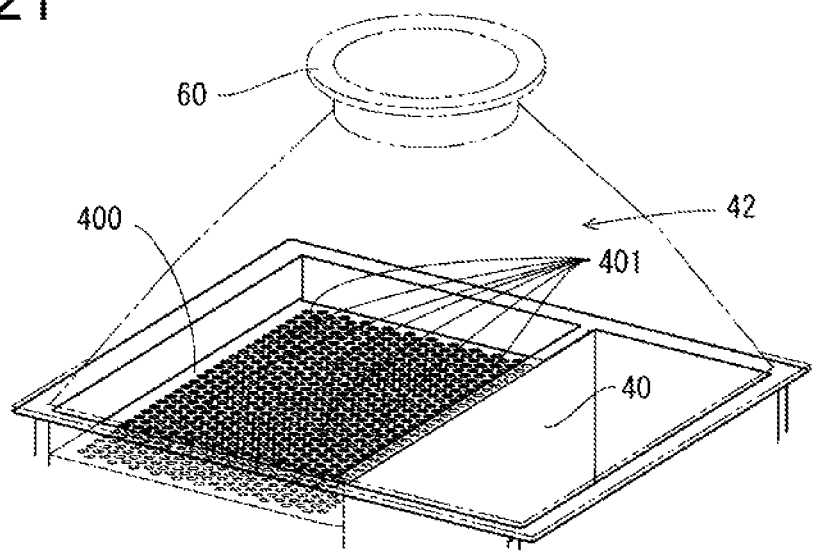
FIG. 21 A perspective view illustrating an internal configuration of a combined casing according to a third embodiment.

A configuration of a reverse-flow prevention plate 400 in a combined casing 33 according to a third embodiment of the present invention will be described below with reference to FIG. 21. In the present embodiment, as illustrated in FIG. 21, a downstream end of a partition plate 40 is terminated in an exhaust gas outlet 42 in the combined casing 33, the exhaust gas outlet 42 being located downstream of a slip processing catalyst 35. In addition, the downstream side of the slip processing catalyst 35 is covered with a reverse-flow prevention plate 400 that is perforated.

With this configuration, the exhaust gas having passed through a main path 31 flows into the exhaust gas outlet 42 through holes constituting an opening 401, and is then discharged from an exhaust discharge pipe 60. Meanwhile, if a part of the exhaust gas flows into the main path 31 while the exhaust gas having passed through a bypass path 32 is flowing into the exhaust gas outlet 42, the reverse-flow prevention plate 400 blocks the part of the exhaust gas not to allow it to enter the slip processing catalyst 35. Thus, with this configuration, even if the exhaust gas having passed through the bypass path 32 flows into the main path 31, it is possible to reduce a phenomenon that the exhaust gas flows to the upstream side of the slip processing catalyst 35. Consequently, it is possible to maintain the cleaning efficiencies of a NOx catalyst 34 and the slip processing catalyst 35.

Fourth Embodiment

Figure 22:
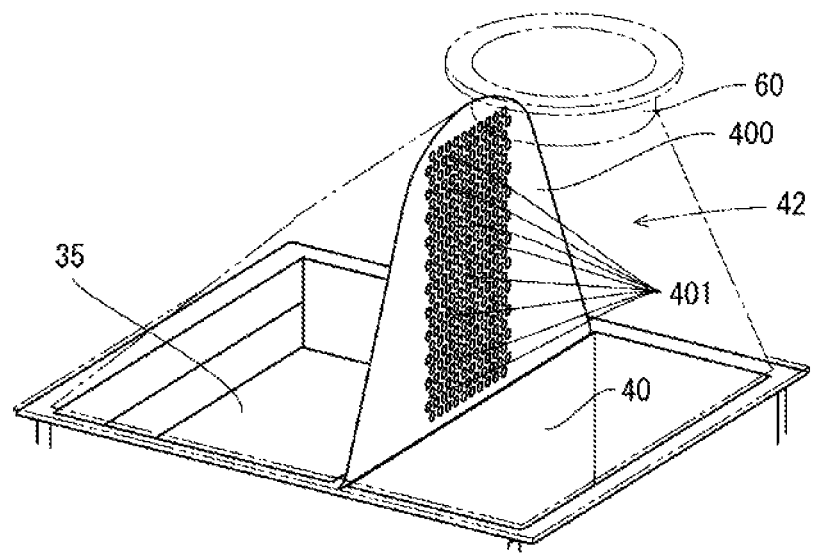
FIG. 22 A perspective view illustrating an internal configuration of a combined casing according to a fourth embodiment.

A configuration of a reverse-flow prevention plate 400 in a combined casing 33 according to a fourth embodiment of the present invention will be described below with reference to FIG. 22. In the present embodiment, as illustrated in FIG. 22, an outflow port 49 disposed in an exhaust gas outlet 42 of the combined casing 33 is positioned in a location close to a bypass path 32. The exhaust gas outlet 42 is tapered with its part corresponding to a main path 31 side being slanted so that a cross-sectional area of the exhaust gas outlet 42 becomes smaller toward the outflow port 49. The outflow port 49 is located in a position where the outflow port 49 overlaps the exhaust side of the bypass path 32.

As illustrated in FIG. 22, the reverse-flow prevention plate 400 having an opening 401 constituted by multiple holes is a downstream end of the partition plate 40 that is extended toward the peripheral edge of the outflow port 49 in the exhaust gas outlet 42 of the combined casing 33 without being bent. Namely, the outflow port 49 is disposed in a location that is in a downstream end of the combined casing 33 and is closer to the bypass path 32 side than the partition plate 40. In addition, the downstream end of the partition plate 40 is extended straightly along an exhaust gas traveling direction in the bypass path 32. This allows a downstream end of the reverse-flow prevention plate 400 to be in contact with a part of the inner wall surface of the downstream end of the combined casing 33, the part being closer to the main path 31 side than the outflow port 49.

Figure 23:
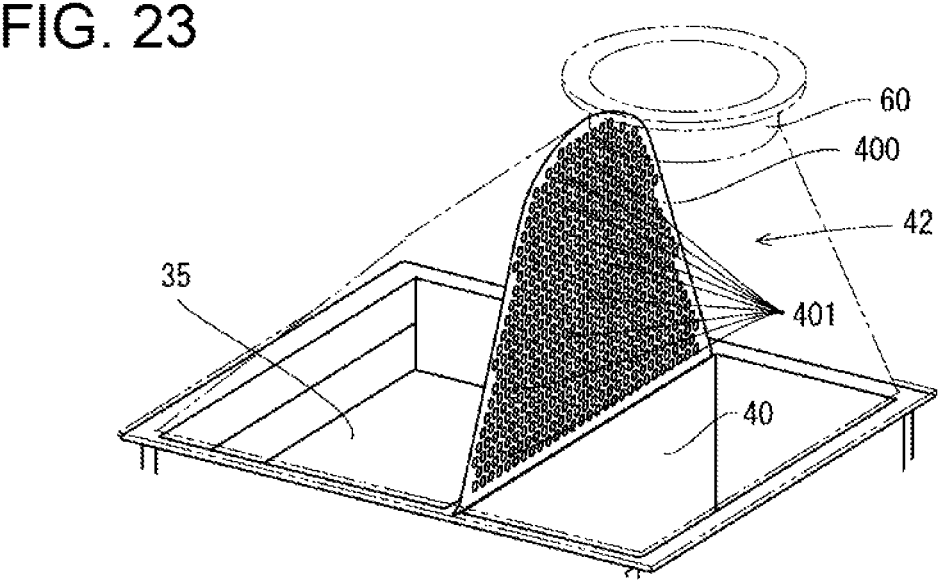
FIG. 23 A perspective view illustrating an internal configuration of another combined casing according to the fourth embodiment.
Figure 24:
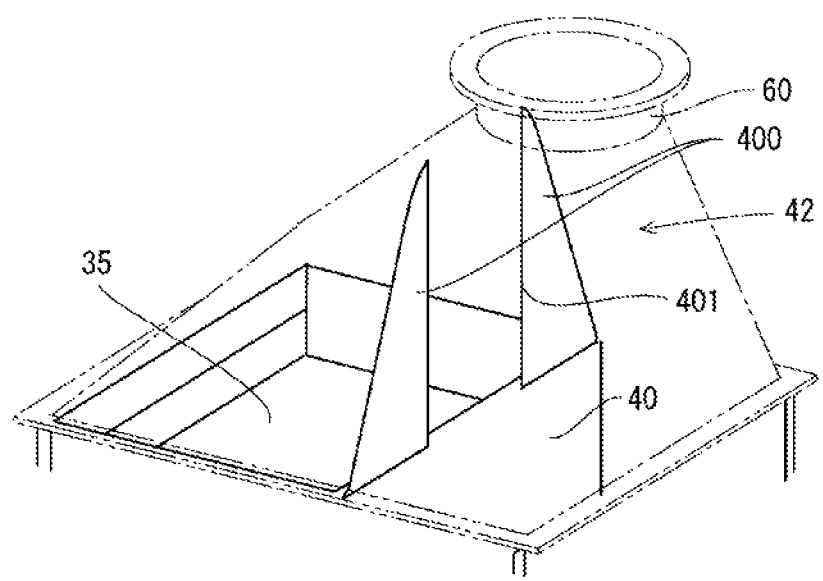
FIG. 24 A perspective view illustrating an internal configuration of another combined casing according to the fourth embodiment.

With this configuration, the exhaust gas passing through the bypass path 32 reaches the outflow port 49 without changing its exhaust gas traveling direction. Consequently, it is possible to reduce the amount of an exhaust gas flowing into the main path 31. In addition, since the reverse-flow prevention plate 400 has a shape conformed to the exhaust gas traveling direction in the bypass path 32, it is possible to further block the flow of the exhaust gas toward the main path 31, and thereby to further reduce the amount of the exhaust gas flowing into the main path 31. Thus, the above configuration can reduce a phenomenon that the exhaust gas having passed through the bypass path 32 flows into the main path 31. This can prevent degradation of the NOx catalyst 34 and the slip processing catalyst 35, and can also reduce a decrease in the exhaust flow rate in a downstream outlet of the main path 31. Alternatively, the reverse-flow prevention plate 400 may have multiple holes 401 provided over an entire surface of the reverse-flow prevention plate 400 as illustrated in FIG. 23 or a hole 401 cut out in a center part of the reverse-flow prevention plate 400 from a downstream side in an exhaust gas traveling direction as illustrated in FIG. 24, in order to reduce a pressure loss in the main path 31.

Others

The configuration of each part is not limited to those in the illustrated embodiments, and can be modified and changed in various ways unless such modifications and changes depart from the scope of the present invention. In the embodiments described above, the present invention is applied to an exhaust gas purification system to be provided in an exhaust gas path 30 of an electricity-generating engine 25. However, the present disclosure is not limited to this. Alternatively, for example, the present disclosure may be applied to an exhaust gas purification system in an exhaust system of a main engine 21.

REFERENCE SIGNS LIST 1 ship
11 engine room
21 main engine
22 speed reducer
23 electricity generating unit
24 diesel generator
25 electricity-generating engine
26 electricity generating unit
30 exhaust gas path
31 main path 32 bypass path
33 combined casing
34 NOx catalyst
35 slip processing catalyst
37 main-side switching valve
38 bypass-side switching valve
40 partition plate
61 urea water injection nozzle (reducing agent injector)
62 exhaust mixer
71 mixer tube
72 mixing fin
400 reverse-flow prevention plate
401 opening

The invention claimed is:

1. An exhaust gas purification device for a ship, the exhaust gas purification device comprising:
a main path including a catalyst and a bypass path branching off from a midway of the main path, each of the main path and the bypass path serving as an exhaust gas path of an engine to be mounted in the ship;
a purification casing in which the main path and the bypass path are disposed; and
parts of the main path and the bypass path are merged with each other for discharging an exhaust gas outside the purification casing, the parts being located downstream in an exhaust gas traveling direction; and
a partition plate by which the main path and the bypass path are partitioned from each other from an upstream side to a downstream side in the exhaust gas traveling direction is disposed in the purification casing and extends along the exhaust gas traveling direction,
wherein:
the partition plate has a downstream end extending through between an exhaust gas outflow port of the purification casing and an exhaust gas outlet of the main path being extended toward a peripheral edge of the exhaust gas outflow port in the exhaust gas outlet of the purification casing without being bent and having an opening, the downstream end serving as a reverse-flow prevention plate,
the reverse-flow prevention plate is a perforated plate having the opening constituted by multiple holes,
the exhaust gas outflow port is in a location adjacent to the bypass path in a position where the exhaust gas outflow port overlaps an exhaust side of the bypass path,
the reverse-flow prevention plate extends straightly along an exhaust gas traveling direction in the bypass path, and
a downstream end of the reverse-flow prevention plate is in contact with a part of an inner wall surface of the downstream end of the purification casing, the part being closer to the main path side than the exhaust gas outflow port.

2. The exhaust gas purification device according to claim 1, wherein the opening is in a part of an inner portion of the reverse-flow prevention plate.

3. The exhaust gas purification device according to claim 1, wherein:
a reducing agent injector of a reducing agent supply device for supplying a reducing agent to an exhaust gas is disposed in a part in the main path, the part being located upstream of the catalyst in the exhaust gas traveling direction, and
cooled air is supplied to the reducing agent injector while the exhaust gas is passing through the bypass path.

4. An exhaust gas purification device comprising:
a purification housing comprising:
an outer casing having a first end and a second end, the purification housing defining a cavity;
one or more inlets;
a partition plate comprising a first surface and a second surface opposite the first surface, the partition plate disposed within the cavity and extending from the first end of the outer casing in an exhaust gas moving direction to define:
a main path defined by a first portion of the outer casing and the first surface of the partition plate;
a bypass path defined by a second portion of the outer casing and the second surface of the partition plate; and
a planar portion that extends along an exhaust gas traveling direction; and
a reverse-flow prevention plate extending from the planar portion of the partition plate; and
an outflow port coupled to the second end of the outer casing, the outflow port in communication with the main path and the bypass path; and
wherein:
the main path is configured to reduce NOx existing in an exhaust gas flowing through the main path; and
the reverse-flow prevention plate is parallel with the planar portion of the partition plate and defines at least one opening.

5. The exhaust gas purification device according to claim 4, wherein the outflow port is aligned with the bypass path.

6. The exhaust gas purification device according to claim 5, wherein a portion of the planar portion is closer to the one or more inlets than to the outflow port.

7. The exhaust gas purification device according to claim 5, wherein the reverse-flow prevention plate extends from the planar portion of the partition plate to a periphery of the outflow port to cover an opening in the main path.

8. The exhaust gas purification device according to claim 7, wherein:
the outflow port is positioned closer to the second surface of the partition plate than the first surface of the partition plate; and
a downstream end of the reverse-flow prevention plate is in contact with an inner surface of the outer casing at a location closer to a main path side than the outflow port.

9. The exhaust gas purification device according to claim 8, wherein:
the reverse-flow prevention plate comprises a first side-edge portion and a second side-edge portion;
the first and second side-edge portions extending along opposing sides of the inner surface of the outer casing; and
the at least one opening is interposed between the first side-edge portion and the second side-edge portion.

10. The exhaust gas purification device according to claim 9, wherein the at least one opening comprises a plurality of openings positioned at substantially equal intervals along a central portion of the reverse-flow prevention plate.

11. The exhaust gas purification device according to claim 10, wherein the plurality of openings are circular.

12. The exhaust gas purification device according to claim 11, wherein:
the outer casing further comprises a side that extends from the first end of the outer casing to the second end of the outer casing; and the planar portion of the partition plate is parallel to the side of the outer casing.

13. The exhaust gas purification device according to claim 12, wherein:
the reverse-flow prevention plate is defined by the partition plate; and
the reverse-flow prevention plate is an extension of the planar portion of the partition plate.

14. The exhaust gas purification device according to claim 5, wherein:
the purification housing comprises a first side that faces the first surface of the partition plate and a second side that faces the second side of the partition plate; and
the outflow port is offset toward the second side of the purification housing such that an entirety of the outflow port is aligned with the bypass path.

15. The exhaust gas purification device according to claim 5, wherein the outflow port is aligned with the bypass path such that an entirety of the outflow port is disposed between the planar portion of the partition plate and the outer casing.

* * * * *